(12) United States Patent
Sinclair

(10) Patent No.: US 12,463,231 B2
(45) Date of Patent: Nov. 4, 2025

(54) FLOW-THROUGH ELECTROCHEMICAL CELL

(71) Applicant: Paul Lincoln Sinclair, Austin, TX (US)

(72) Inventor: Paul Lincoln Sinclair, Austin, TX (US)

(73) Assignee: Paul Sinclair, Austin, TX (US)

( * ) Notice: Subject to any disclaimer, the term of this patent is extended or adjusted under 35 U.S.C. 154(b) by 124 days.

(21) Appl. No.: 17/435,578

(22) PCT Filed: Mar. 3, 2020

(86) PCT No.: PCT/US2020/020736
§ 371 (c)(1),
(2) Date: Sep. 1, 2021

(87) PCT Pub. No.: WO2020/180838
PCT Pub. Date: Sep. 10, 2020

(65) Prior Publication Data
US 2022/0149416 A1    May 12, 2022

Related U.S. Application Data

(60) Provisional application No. 62/970,156, filed on Feb. 4, 2020, provisional application No. 62/969,620, filed
(Continued)

(51) Int. Cl.
*H01M 8/18* (2006.01)
*H01M 4/86* (2006.01)
*H01M 8/04186* (2016.01)

(52) U.S. Cl.
CPC ......... *H01M 8/188* (2013.01); *H01M 4/8621* (2013.01); *H01M 4/8626* (2013.01); *H01M 8/04186* (2013.01)

(58) Field of Classification Search
CPC .. H01M 10/38; H01M 4/8605; H01M 4/8621; H01M 4/8626; H01M 8/04186; H01M 8/188; H01M 8/249
See application file for complete search history.

(56) References Cited

U.S. PATENT DOCUMENTS 4,144,301 A    3/1979  Adams et al.
4,731,168 A    3/1988  McIntyre
(Continued)

FOREIGN PATENT DOCUMENTS

CN    102683740    9/2012
CN    102916161    2/2013
(Continued)

OTHER PUBLICATIONS

PCT International Search Report and the Written Opinion of the International Application No. PCT/US2020/20736; mailing date Jun. 10, 2020, 13 pages.
(Continued)

*Primary Examiner* — Brian R Ohara
*Assistant Examiner* — Brent C Thomas
(74) *Attorney, Agent, or Firm* — McDermott Will & Schulte LLP

(57) ABSTRACT

The present disclosure provides a flow-through rechargeable electrochemical cell including a container housing a cathode and an anode; a closed loop fluidly connected to the container; a fluid electrolyte in the container and closed loop and including a working ion; and a pump configured to cause the fluid electrolyte to flow through the closed loop, the porous cathode, and the porous anode in a first direction during discharge of the electrochemical cell. The present disclosure further includes a flow-through rechargeable battery including multiple electrochemical cells, a closed loop, and a pump.

46 Claims, 11 Drawing Sheets

Related U.S. Application Data on Feb. 3, 2020, provisional application No. 62/878,733, filed on Jul. 25, 2019, provisional application No. 62/823,547, filed on Mar. 25, 2019, provisional application No. 62/813,132, filed on Mar. 3, 2019.

(56) References Cited

U.S. PATENT DOCUMENTS

| | | | |
|---|---|---|---|
| 5,705,051 A * | 1/1998 | Coin | B01D 53/1425 |
| | | | 205/770 |
| 6,280,878 B1 | 8/2001 | Maruyama et al. | |
| 6,287,720 B1 | 9/2001 | Yamashita et al. | |
| 9,461,298 B2 | 10/2016 | Suppes | |
| 2009/0155678 A1 | 6/2009 | Less et al. | |
| 2011/0223450 A1* | 9/2011 | Horne | B60L 53/30 |
| | | | 429/72 |
| 2011/0244277 A1* | 10/2011 | Gordon, II | H01M 8/20 |
| | | | 429/51 |
| 2012/0082873 A1* | 4/2012 | Fischel | H01M 8/08 |
| | | | 429/61 |
| 2013/0187618 A1 | 7/2013 | Suppes | |
| 2013/0189592 A1 | 7/2013 | Roumi et al. | |
| 2015/0236363 A1 | 8/2015 | Polcyn et al. | |
| 2015/0263379 A1 | 9/2015 | Xiao et al. | |
| 2016/0260549 A1 | 9/2016 | Chen | |
| 2017/0025697 A1 | 1/2017 | Williams | |
| 2018/0205067 A1* | 7/2018 | Markiewicz | H01M 4/0404 |
| 2018/0342751 A1* | 11/2018 | Klassen | H01M 8/248 |

FOREIGN PATENT DOCUMENTS

| | | |
|---|---|---|
| EP | 2942828 | 11/2015 |
| JP | H05-290856 | 11/1993 |
| JP | 2003-511830 | 3/2003 |
| JP | 2011-146224 | 7/2011 |
| JP | 2017-117617 | 6/2017 |
| KR | 10-2009-0049851 | 5/2009 |
| KR | 10-2015-0063339 | 6/2015 |
| WO | 2013/174149 | 11/2013 |
| WO | 2016/158663 | 6/2016 |
| WO | 2017/096258 | 6/2017 |

OTHER PUBLICATIONS

PCT International Preliminary Report on Patentability of International Application No. PCT/US2020/20736; mailing date Sep. 16, 2021, 9 pages.
PCT International Search Report and the Written Opinion of the International Application No. PCT/US2021/022001; mailing date May 18, 2021, 12 pages.
PCT International Preliminary Report on Patentability of International Application No. PCT/US2021/022001; mailing date Sep. 22, 2022, 10 pages.
Taiwan Office Action and Search Report, Application No. 109106977, 9 pages, Nov. 23, 2023.
Taiwan Office Action, Application No. 109106977, 9 pages, Jul. 3, 2024 (with English translation).
European Search Report, Application No. 20765562.2, 9 pages, Nov. 27, 2024.
Korean Office Action, Application No. 10-2021-7030972, 16 pages, Mar. 13, 2025 (English translation).
Extended European Search Report received for Europe Patent Application No. 21768536.1, mailed May 12, 2025; 9 pages.
Japanese Office Action, Application No. 2022-554532, 11 pages, Mar. 5, 2025 (English Translation).
Korean Office Action, Application No. 10-2022-7034910, 20 pages, Aug. 4, 2025 (English translation).

* cited by examiner

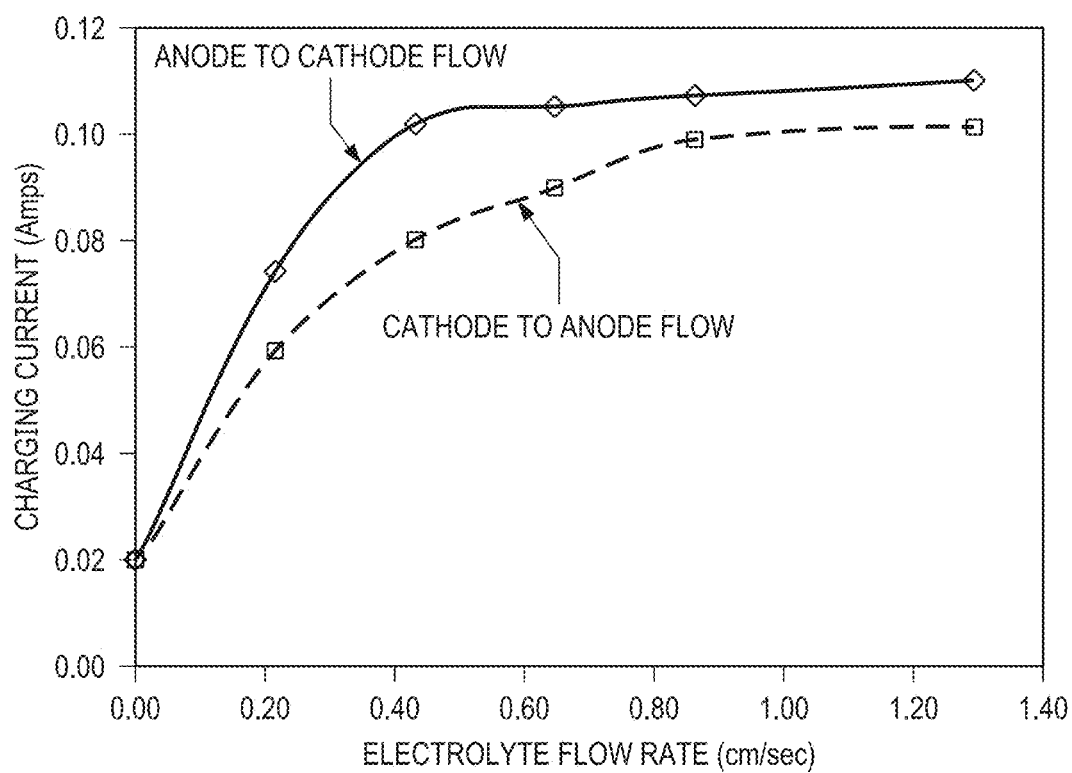

FLOW-THROUGH ELECTROCHEMICAL CELL

CROSS-REFERENCE TO RELATED APPLICATIONS

The present application is a U.S. National Stage Filing under 35 U.S.C. § 371 of International Patent Application Serial No. PCT/US2020/020736 filed Mar. 3, 2020, which claims the benefit of the following U.S. Provisional applications: U.S. Provisional Application Ser. No. 62/813,132, filed Mar. 3, 2019, entitled FLOW-THROUGH ELECTROCHEMICAL CELL, which is incorporated herein by reference in the entirety; U.S. Provisional Application Ser. No. 62/823,547, filed Mar. 25, 2019, entitled 3-D PRINTED ELECTRODE FOR FLOW-THROUGH ELECTROCHEMICAL CELL, which is incorporated herein by reference in the entirety; U.S. Provisional Application Ser. No. 62/878,733, filed Jul. 25, 2019, entitled EXPANDABLE ELECTRODE FOR FLOW-THROUGH ELECTROCHEMICAL CELL, which is incorporated herein by reference in the entirety; U.S. Provisional Application Ser. No. 62/969,620, filed Feb. 3, 2020, entitled POROUS ELECTRODE FOR FLOW-THROUGH ELECTROCHEMICAL CELL, which is incorporated herein by reference in the entirety; and U.S. Provisional Application Ser. No. 62/970,156, filed Feb. 4, 2020, entitled BATTERY USING FLOW-THROUGH ELECTROCHEMICAL CELLS, which is incorporated herein by reference in the entirety.

TECHNICAL FIELD

The present disclosure generally relates to a rechargeable electrochemical cell and in particular, to a flow-through rechargeable electrochemical cell, a flow-through rechargeable battery containing a flow-through electrochemical cell, and a device including a flow-through rechargeable battery.

BACKGROUND

An electrochemical cell has two electrodes, the anode and the cathode, and an electrolyte. The electrodes include materials, referred to as active materials that are both electronically active and chemically active. The active materials in the anode and cathode are able to gain and lose ions, typically the same ion, which is a cation (positive ion) referred to as the working ion of the electrochemical cell. The electrolyte conducts the working ion, but is an electronic insulator. As a result, any movement of electrons between the anode working material and the cathode working material must take place through an external circuit that is in electronic contact with both the anode and the cathode. Typically, the anode active material, the cathode active material, or both contains the working ion prior to cycling of the electrochemical cell.

A rechargeable electrochemical cell or rechargeable battery is typically identified as by type based on its working ion, leading to identifications such as "lithium ion battery," "hydrogen ion battery," etc.

During cycling, the electrolyte conducts the working ion inside the electrochemical cell, while electrons to move through the external circuit. Electrons tend to flow without requiring an external energy input during discharge, allowing energy stored in the electrochemical cell to, for example, power a device. During charge, and external energy supply is typically used to cause electrons to flow in the opposite direction, storing energy from the energy supply in the electrochemical cell.

SUMMARY

The present disclosure provides a flow-through rechargeable electrochemical cell including a container housing a cathode and an anode; a closed loop fluidly connected to the container; a fluid electrolyte in the container and closed loop and including a working ion; and a pump configured to cause the fluid electrolyte to flow through the closed loop, the porous cathode, and the porous anode in a first direction during discharge of the electrochemical cell.

The electrochemical cell may further include the following features, which may be combined with one another in any combinations and with other features disclosed in the present specification, unless clearly mutually exclusive:

i) the pump may be configured to cause the fluid electrolyte to flow in a second direction, opposite the first direction, during charge of the electrochemical cell;

ii) the cathode, the anode, or both may include a high-porosity base material having a porosity between 40% and 99%;

iii) the cathode and the anode may include a high-porosity base material having a porosity between 40% and 99%;

iv) the cathode, the anode, or both may include a high-porosity base material coated with an active material and have a porosity between 5% and 50%;

v) the cathode and the anode may include a high-porosity base material coated with an active material and have a porosity between 5% and 50%;

vi) the pump may be a positive-displacement pump, a peristaltic pump, a rotary-vane type pump, or progressive-cavity pump;

vii) the pump may be configured to pump the fluid electrolyte through the electrochemical cell at a linear flow rate between 0.01 cm/s to 100 cm/s;

viii) the cathode, the anode, or both include a high-porosity material having an internal surface area to volume ratio between $1/d$ and $6/d$, in which d is the average maximum internal distance within a pore;

ix) the cathode, the anode, or both may include a high-porosity material including cells with an octagonal, hexagonal, square, rectangular, rhomboid, triangular, ovoid, oblate spherical, or circular cross-section and having an average cross-sectional maximum internal distance of between 0.01 mm and 1.0 mm;

x) the cells may form pores having a length equal to the width of the electrode in a direction perpendicular to a cross-sectional plane of the cells;

xi) the cells may form pores having a length between 2 cm and 20 cm in a direction perpendicular to a cross-sectional plane of the cells;

xii) the cells may form pores having a length in a direction perpendicular to a cross-sectional plane of the cells, and wherein at least 60%, at least 80%, or at least 90% of all pores in the electrode are continuously open along their respective lengths;

xiii) the electrode may include between 10 and 100 layers of stacked, folded, or stacked and folded high-porosity material having cells;

xiv) the cathode, the anode, or both may be a rolled electrode including a rolled sheet of high-porosity material;

xv) the high-porosity material may include a metal foam or a carbon foam;

xvi) the cathode, the anode, or both may be woven wire mesh (WWM) electrodes including between 10 and 100 layers of stacked, folded, or stacked and folded woven wire mesh;

xvii) the working ion may include an alkali metal ion;

xviii) the working ion may include hydrogen ion (H$^+$) or hydroxyl ion (OH$^-$);

xvix) the anode may include a metal operable to form a solid solution of the hydrogen ion;

xx) the electrochemical cell may further include a separator including an electronically insulating permeable membrane configured to allow passage of the working ion and flow of the fluid electrolyte through the membrane.

The present disclosure further provides a flow-through rechargeable battery including a plurality of electrochemical cells each including a container housing a cathode and an anode; and a fluid electrolyte including a working ion; a closed loop fluidly connected to containers of the electrochemical cells and containing the fluid electrolyte; and a pump configured to cause the fluid electrolyte to flow through the closed loop and the electrochemical cells in a first direction during discharge of the battery.

The battery may further include the following features, which may be combined with one another in any combinations and with other features disclosed in the present specification, unless clearly mutually exclusive:

i) the battery may include between 2 and 500 electrochemical cells;

ii) the pump may be configured to cause the fluid electrolyte to flow in a second direction, opposite the first direction, during charge of the battery;

iii) the battery may include at least one internal loop fluidly connected between containers of the electrochemical cells and containing the fluid electrolyte, wherein the pump is also configured to cause the fluid electrolyte to flow through the internal loops in the first direction during discharge of the battery;

iv) the battery may include at least one internal loop fluidly connected between containers of the electrochemical cells and containing the fluid electrolyte, wherein the pump is also configured to cause the fluid electrolyte to flow through the internal loops in the second direction during charge of the battery;

v) the battery may include at least one internal circuit electronically connecting at least two of the electrochemical cells;

vi) the cathode, the anode, or both of the electrochemical cells may include a high-porosity base material having a porosity between 40% and 99%;

vii) both the cathode and the anode of the electrochemical cells may include a high-porosity base material having a porosity between 40% and 99%;

viii) the cathode, the anode, or both of the electrochemical cells may include a high-porosity base material coated with an active material and have a porosity between 5% and 50%;

ix) both the cathode and the anode of the electrochemical cells may include a high-porosity base material coated with an active material and have a porosity between 5% and 50%;

x) the pump may be a positive-displacement pump, a peristaltic pump, a rotary-vane type pump, or progressive-cavity pump;

xi) the pump may be configured to pump the fluid electrolyte through the electrochemical cell at a linear flow rate between 0.01 cm/s to 100 cm/s;

xii) the cathode, the anode, or both of the electrochemical cells may include a high-porosity material having an internal surface area to volume ratio between 1/d and 6/d, in which d is the average maximum internal distance within a pore;

xiii) the cathode, the anode, or both of the electrochemical cells may include a high-porosity material including cells with an octagonal, hexagonal, square, rectangular, rhomboid, triangular, ovoid, oblate spherical, or circular cross-section and having an average cross-sectional maximum internal distance of between 0.01 mm and 10 mm;

xiv) the cells may form pores having a length equal to the width of the electrode in a direction perpendicular to a cross-sectional plane of the cells;

xv) the cells may form pores having a length between 2 cm and 20 cm in a direction perpendicular to a cross-sectional plane of the cells;

xvi) the cells may form pores having a length in a direction perpendicular to a cross-sectional plane of the cells, and wherein at least 60%, at least 80%, or at least 90% of all pores in the anode or cathode are continuously open along their respective lengths;

xvii) the electrode may include between 10 and 100 layers of stacked, folded, or stacked and folded high-porosity material having cells;

xviii) the cathode, the anode, or both of the electrochemical cells may be a rolled electrode including a rolled sheet of high-porosity material;

xix) the high-porosity material may include a metal foam or a carbon foam;

xx) the cathode, the anode, or both of the electrochemical cells may be woven wire mesh (WWM) electrodes including between 10 and 100 layers of stacked, folded, or stacked and folded woven wire mesh;

xxi) the working ion may include an alkali metal ion;

xxii) the working ion may include hydrogen ion (H$^+$) or hydroxyl ion (OH$^-$);

xxiii) the anode of the electrochemical cells may include a metal operable to form a solid solution of the hydrogen ion;

xxiv) the electrochemical cells may further include a separator including an electronically insulating permeable membrane configured to allow passage of the working ion and flow of the fluid electrolyte through the membrane.

BRIEF DESCRIPTION OF THE DRAWINGS

Embodiments of the present disclosure are described by way of example in greater detail with reference to the attached figures, which are not necessarily to scale, and in which:

FIG. 6 is a graph of battery charging current vs. linear flow rate in the electrochemical cell of FIGS. 1A and 1B.

DETAILED DESCRIPTION

The present disclosure relates to a flow-through rechargeable electrochemical cell, a flow-through rechargeable battery containing a flow-through rechargeable electrochemical cell, and devices including a flow-through rechargeable battery, and associated methods of making and using such electrochemical cells, batteries, and devices.

A rechargeable electrochemical cell is a device that may undergo at least one charge/discharge cycle. The terms "battery" and "electrochemical cell" are sometimes used interchangeably or given particular meanings in different contexts. The term "electrochemical cell" is used in the present disclosure to describe a device including one anode, one cathode, and an electrolyte. The term "battery" is used in the present disclosure to describe a device containing a plurality of electrochemical cells.

Electrochemical cells of the present disclosure may have a porous cathode and anode, a separator that allows fluid flow, and a pump to circulate a fluid electrolyte through the electrochemical cell. The working ion may be an alkali metal ion, such as lithium ion ($Li^+$), sodium ion ($Na^+$), or potassium ion ($K^+$), hydrogen ion ($H^+$), or hydroxyl ion ($OH^-$).

Figure 1A:
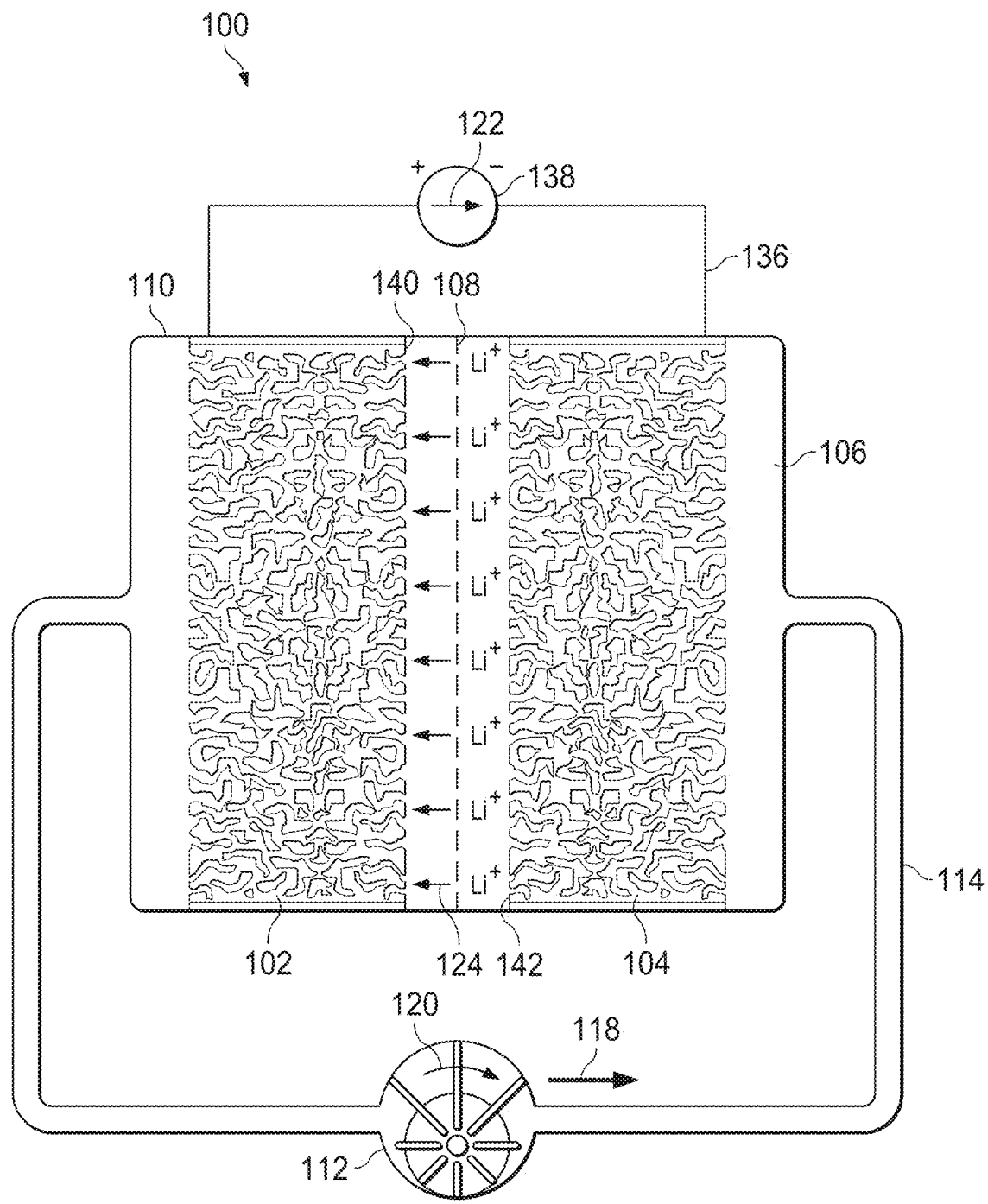
FIG. 1A is a cross-sectional schematic diagram of a flow-through rechargeable electrochemical cell during discharge.
Figure 1B:
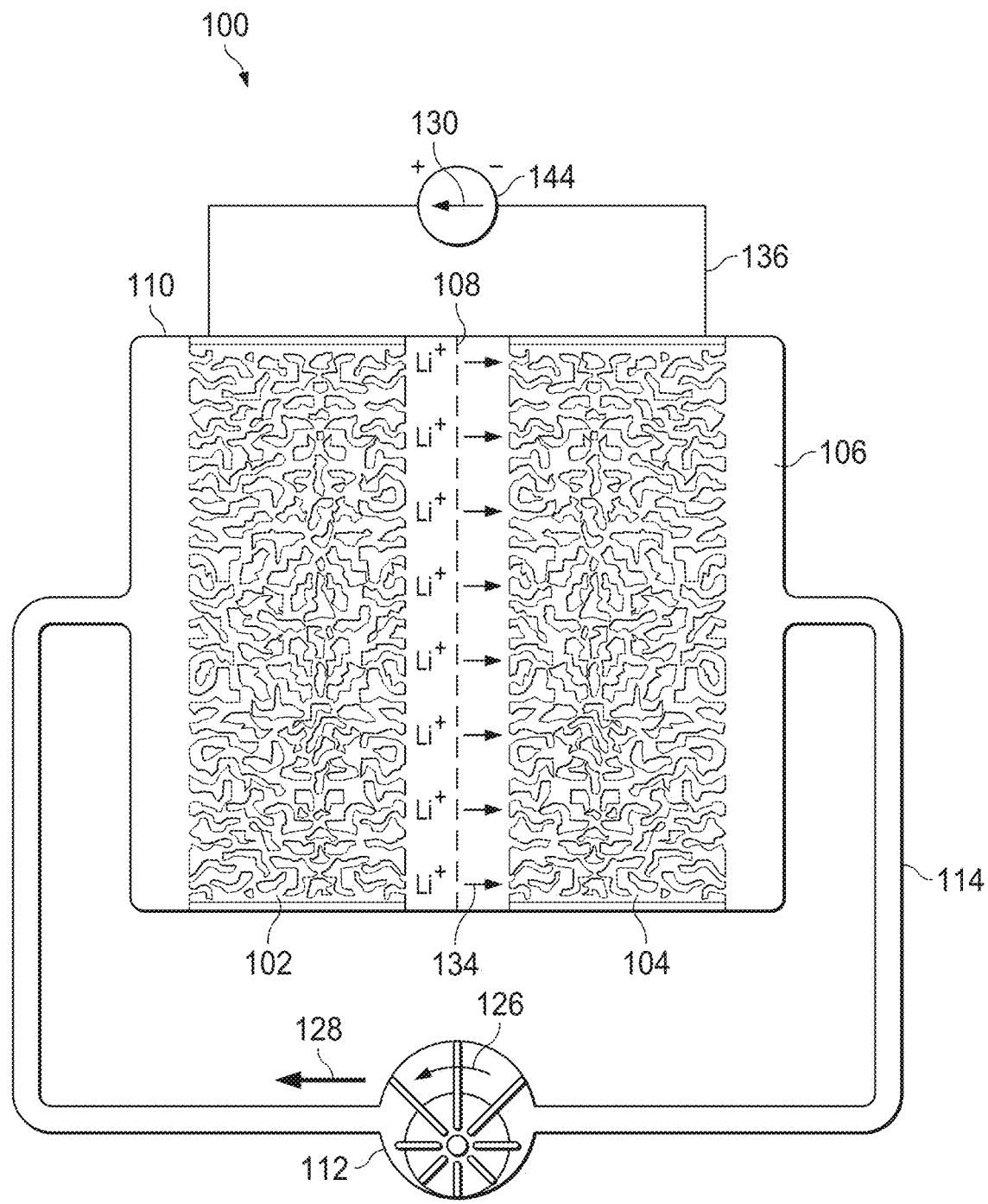
FIG. 1B is a cross-sectional schematic diagram of the flow-through rechargeable electrochemical cell of FIG. 1A during charge.

Referring now to FIGS. 1A and 1B, electrochemical cell 100 includes a cathode 102, an anode, 104 (collectively the electrodes), and an electrolyte 106, and an electronically insulating separator 108 housed in a container 110. To facilitate flow of the electrolyte 106 through the cathode 102 and the anode 104, the container 110 is fluidly connected to a closed loop 114 which includes a pump 112.

As illustrated in FIGS. 1A and 1B, the electrochemical cell is configured such that the electrodes and separator are arranged in a stack in which the separator 108 is located between the anode 104 and the cathode 102 in order to help prevent electronic contact between the anode 104 and the cathode 102 other than through the external circuit 136. The closed loop 114 is connected to the container 110 such that the fluid electrolyte enters the container 110 from the closed loop 114, flows through the stack of the anode 104, the separator 108, and the cathode 102, then leaves the container 110 to re-enter the closed loop 114. As illustrated in FIGS. 1A and 1B, the closed loop 114 is simply connected to the container 110 on opposite sides of the stack, but other configurations are possible so long as the fluid flows through the stack.

Although the electrochemical cell 100 illustrated in FIGS. 1A and 1B contains a separator 108, alternative electrochemical cells may lack a separator. For example, the cathode 102 and the anode 104 may be held in place by attachment to the container 110 or another non-separator structure within the electrochemical cell 100 such that they are not in electronic contact. Although such a configuration, lacking a separator, may not function in many conventional electrochemical cells due to the formation of dendrites which are blocked by a separator, the flow of the fluid electrolyte through the electrochemical cell 100 may prevent or substantially decrease dendrite formation as compared to a similar electrochemical cell that is not a flow-through cell, making a separator unnecessary.

Although the electrochemical cell 100 is illustrated with a cylindrical container 100, other container shapes, such as cuboid, cubic, or coin-shaped are possible. Container 100 may include any suitable material able to resist degradation by the fluid electrolyte or other chemicals found within the electrochemical cell 100, including chemicals formed during cycling of the electrochemical cell 100. A suitable material may also be able to maintain the shape of the electrochemical cell 100 during charge and discharge or over the expected life of the electrochemical cell 100. Suitable materials include steel, glass, bituminous compounds, ceramic materials, and polymers. The container 110 may include multiple materials, such as, for example, a metal outer layer with a degradation-resistant lining or coating.

The closed loop 114 may include the same material as the container 100, or a different material. The closed loop 114 may include any suitable material able to resist degradation by the fluid electrolyte or other chemicals found within the electrochemical cell 100, including chemicals formed during cycling of the electrochemical cell 100. A suitable material may also be able to maintain a shape, such as a cross-sectional shape without collapse, over the expected life of the electrochemical cell 100. Suitable materials include steel, glass, bituminous compounds, ceramic materials, and polymers. The closed loop 114 may include multiple materials, such as, for example, a metal outer layer with a degradation-resistant lining. The closed loop 114 may be flexible or rigid.

The pump 112 in closed loop 114 may be any pump sufficient to cause the fluid electrolyte 106 to flow through the closed loop 114 and the electrodes in the container 110 and to be reversible to cause flow in one direction during charge and the opposite direction during discharge. The pump 112 may be a positive-displacement pump, as illustrated, a peristaltic pump, a rotary-vane type pump, or progressive-cavity pump. The pump 112 maybe located within the fluid flow passage of the closed loop 114, as illustrated, or it may be an external pump, such as a peristaltic pump. The pump 112 may operate at a fixed flow rate or a variable flow rate.

Flow rates in the closed loop 114 may be measured as a linear flow rate through the electrodes or a volumetric flow rate through the electrodes. If the theoretically linear flow rate differs between the two electrodes, the lower linear flow rate will dictate the actual linear flow rate through the electrodes. The linear flow rate may be dictated by a number of factors, such as the pump 112 and permeability of the electrodes and separator (if present) to the fluid electrolyte 106. Suitable linear flow rates may cause an increase in ionic mobility of the working ion as compared to an identical electrochemical cell with no flow by a factor of between 2 and 20, 5 and 15, 8 and 12, or 10. Suitable linear flow rates may range from 0.01 cm/s to 100 cm/s, between 0.01 cm/s and 50 cm/s, between 1 cm/s and 100 cm/s, or between 1 cm/s and 50 cm/s.

Volumetric flow rates reflect the linear flow rate and the electrode volume. Suitable volumetric flow rates cause an increase in ionic mobility of the working ion as compared to an identical electrochemical cell with no flow by a factor of between 2 and 20, 5 and 15, 8 and 12, or 10.

In general, peristaltic pumps or rotary-vane type pumps can provide a low or moderate flow rate with modest power requirements. Progressive-cavity pumps can provide higher flow rates with higher power requirements. Due to their higher power requirements, progressive-cavity pumps may be more suitable for use in flow-through electrochemical cells in large stationary batteries, such as in grid storage and other electric utility applications, or in ship batteries.

The pump 112 may be powered by an external power supply during charge, discharge, or both of the electrochemical cell 100. In particular the pump 112 may be powered by the same external energy supply, such as charger 144, during charge. The pump 112 may be powered by the electrochemical cell 100 itself during discharge. The pump 112, particularly if within closed loop 114, may include electronically insulating components so that the electrochemical cell 100 cannot discharge except through the external circuit 136. The pump 112 may also be a positive-displacement type pump, such as a peristaltic pump, that physically isolates short sections of electrolyte, thereby physically interrupting a possible electronic circuit along the closed loop 114.

If the pump 112 is located within the fluid flow passage of the closed loop 114, the pump 112 may include or be coated with a material able to resist degradation by the fluid electrolyte or other chemicals found within the electrochemical cell 100, including chemicals formed during cycling of the electrochemical cell 100.

Figure 5:
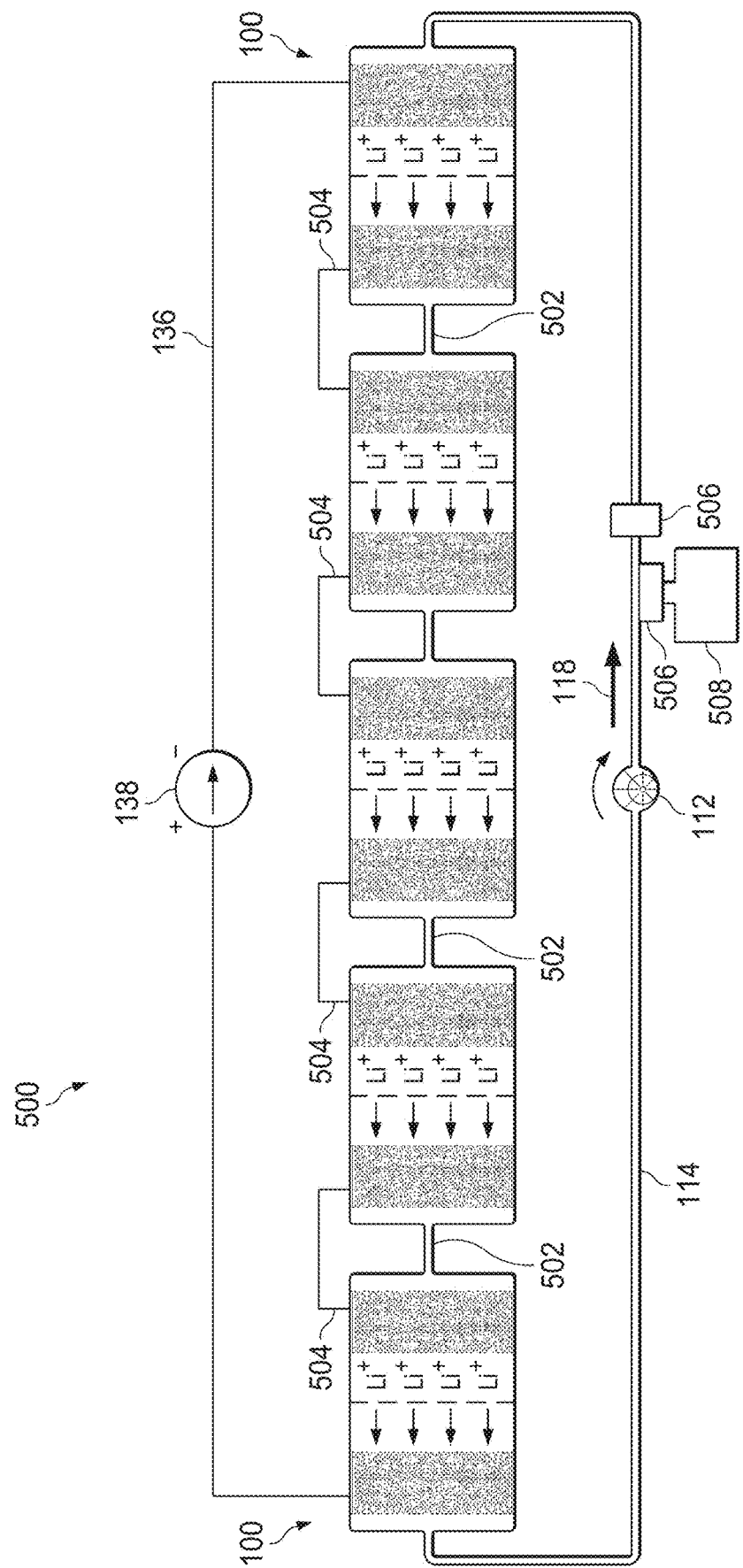
FIG. 5 is cross-sectional schematic diagram of a flow-through rechargeable battery containing multiple electrochemical cells of FIGS. 1A and 1B.

Although FIGS. 1A, 1B, and 5 are illustrated with a single pump 112, multiple pumps may be present. For example, a battery containing a plurality of electrochemical cells may contain pumps between electrochemical cells or sets of electrochemical cells to maintain flow of the fluid electrolyte, particularly if a large number of electrochemical cells are present, or the permeability of each cell is not high. A plurality of pumps 112 may be driven by one motor to help them remain in sync, or by a plurality of motors.

The separator 108 may be a permeable membrane that allows passage of the working ion and flow of the fluid electrolyte 106 through the membrane. The separator 108 may include woven fibers, nonwoven fibers, polymer films, ceramics, and naturally occurring substances. Nonwoven fibers may include cotton, nylon, polyester fibers, papers, and glass fibers. Polyester films may include polyethylene, polypropylene, poly(tetrafluoroethylene), poly(ethylene terephthalate), and polyvinyl chloride films. Naturally occurring substances may include rubber, asbestos, and wood. The separator 108 may be between 10 µm and 5000 µm thick, between 10 µm and 1000 µm thick, between 10 µm and 500 µm thick, between 10 µm and 100 µm thick, or between 20 µm and 70 µm thick, which thinner separators being most useful in many electrochemical cells 100.

The cathode 102 may be a porous cathode. For example, the cathode 102 may include a high-porosity cathode base material, such as a high-porosity metal or carbon foam that is permeable to the fluid electrolyte. Suitable high-porosity metal foams include Ni, Fe, Cu, and Al foams. The porosity of the high-porosity cathode base material may be greater than 40%, such as between 40% and 90% or between 40% and 99%. In particular, the porosity may be between 80% and 90%. The porous nature also allows the fluid electrolyte 106 to flow through the cathode 102.

The high-porosity cathode base material may be coated with a cathode active material. In particular, the pore surfaces of the high-porosity cathode base material may be coated with the cathode active material. After coating with the cathode active material, the cathode 102 may still maintain a porosity of at least 5%, at least 10%, or at least 20%, such as between 5% and 50%, between 10% and 50%, and between 20% and 50%, or a porosity sufficient to allow flow of the fluid electrolyte 106 at a set linear or volumetric flow rate.

The porous nature of the high-porosity cathode base material provides a high internal surface area to volume ratio. For example, the internal surface area to volume ratio may be between $1/d$ and $6/d$, or between $2/d$ and $4/d$, in which d is the average maximum internal distance within a pore, such as the average diameter of a spherical pore. This ratio depends on the pore size and shape. For example, if the pores are spherical, of uniform size, and packed in a simple cubic array, each pore borders six others. With a very small intersection of the spheres, which may be ignored in theoretical calculations, channels are opened between all of the pores. If the pore diameter is d, then the internal surface area of the pore is $\pi d^2$ and it occupies a volume of base material equal to $d^3$. The surface-area/volume ratio of the set of pores is therefore $\pi/d$. As a result, smaller pore diameter produces a higher ratio which is desirable. However, the need to coat each pore with cathode active material having a thickness t and still allow flow through the pores places an asymptotic lower limit to the pore diameter. In order to allow suitable fluid flow and maintain suitable porosity, typically d is at least 3t. d may also be at least 4t or at least 5t, between 3t and 5t, or between 3t and 10t.

The volume of active material coating the inside surface area of the pore is $[\pi d^3/6 - \pi (d-2t)^3/6]$, and if d=3t, then the active material volume is $\pi (27-1)t^3/6 = 13.61t^3$ within a unit volume of $27t^3$. Thus, the approximate ratio of the volume of active material to total electrode volume is 13.61/27=0.504 or about 50%. The appropriate ratio may range from 5% to 60% or from 5% to 55%.

The ideal pore-size may thus be set by the thickness t of active material. The ideal thickness t may be set by the distance that the working ion may be able to diffuse into the active material. These theoretical calculations represent a lower limit because an actual high-porosity cathode base material with randomly-shaped pores and an intrinsic porosity of 80-90% will exhibit a higher surface-area/volume ratio than in the theoretical calculations above. For example, in practice, a ratio closer to 5/d is attainable.

Suitable cathode active materials may include a crystalline composition in which the working ion may intercalate and de-intercalate over multiple charge/discharge cycles. In particular, the cathode active material may include a transition metal oxide, phosphate, silicate, sulfate, or vanadate. Suitable transition metals include Co, Fe, Mn, V, Ni, Ti and combinations thereof. The cathode active material may include a single transition metal, such as $LiCoO_2$, $LiNiO_2$, $LiFePO_4$, $LiCoPO_4$, $LiMnPO_4$, $LiFeSO_4$, $LiCoSO_4$, $LiNiSO_4$, $LiMnSO_4F$ $Li_2MnO_3$, $LiMnO_2$, $LiVO_2$, $V_6O_{13}$, $LiFePO_4F$, $LiVPO_4F$, $LiTiPO_4F$, $Li_2CoPO_4F$, $Li_2NiPO_4F$, $LiFeSO_4F$, $LiCoSO_4F$, $LiNiSO_4F$, $LiMnSO_4F$, and $LiMn_2O_4$. The cathode active material may also include a mixture of transition metals, such as $LiNiCoMnO_2$, $LiNiCoAlO_2$, $LiFeCoPO_4$, $LiNi_{1-y}Co_yO_2$, $LiNi_{1-y-z}Co_yAl_zO_2$, $LiNi_{0.5}Mn_{0.5}O_2$, $LiNi_{1-y-z}Mn_yCo_zO_2$, $Li_xNa_{0.5-x}MnO_2$, $LiNi_{0.5}Mn_{1.5}O_4$. In addition, Na, K, or other alkali metal equivalents of these cathode active material may be used, as may specific Na or K cathode active materials, such as $Na_3V_2(PO_4)_2F_3$, or H cathode active materials, such as a Ni foam impregnated with $Ni(OH)_2$. The cathode active material may integrally include other materials that do not directly participate in an electrochemical reaction, such as a carbon coating often present on LiFePO$_4$ to improve its electronic conductivity. Another example is the inclusion of nickel metal powder or nickel oxide in the Ni(OH)$_2$ of an H cathode active material. A coating of Co(OH)$_2$ may be used to enhance performance of the Ni(OH)$_2$.

The anode 104 may be a porous anode. For example, the anode 104 may include a high-porosity anode base material, such as a high-porosity metal or carbon foam that is permeable to the fluid electrolyte. Suitable high-porosity metal foams include Ni, Fe, Cu, and Al foams. The porosity of the high-porosity cathode base material may be greater than 40%, such as between 40% and 90% or between 40% and 99%. In particular, the porosity may be between 80% and 90%. The porous nature also allows the fluid electrolyte 106 to flow through the anode 104.

The high-porosity anode base material may be coated with an anode active material. In particular, the pore surfaces of the high-porosity anode base material may be coated with the anode active material. After coating with the anode active material, the anode 104 may still maintain a porosity of at least 5%, at least 10%, or at least 20%, such as between 5% and 50%, between 10% and 50%, and between 20% and 50%, or a porosity sufficient to allow flow of the fluid electrolyte 106 at a set linear or volumetric flow rate.

Alternatively, the high-porosity anode base material may simply include the anode active material, such that coating is unnecessary.

The high-porosity anode base material may have an internal surface area to volume ratio similar to what is described for the high-porosity cathode base material above and the ratio may be subject to similar calculations.

Suitable anode active materials may include compositions on which the working ion may plate out in its metallic form, or with which the working ion may react, for example by intercalating in the anode active material crystal structure. Suitable anode active material compositions include Li, C, Si, Sn, Pb, Ge, Ti, Cu, Ni, Co, Mn, and Zn compounds. For example, such materials may include hard carbon material, soft carbon materials, carbon nanotubes, graphene, Si nanowires, Si thin films, Li$_{1.5}$Ge$_4$, Sn, Pb, TiO$_2$, Li$_4$Ti$_5$O$_{12}$, Ti—Nb oxides, GeO$_2$, Sn oxides, Si oxides, CoO, NiO, CuO, MnO, Mn$_2$Mo$_3$O$_8$, ZnCo$_2$O$_4$, ZnFe$_2$O$_4$, TiNi, and Ti$_2$Ni. In addition, Na, K, or other alkali metal equivalents of these anode active material may be used, as may H anode active materials, such as TiNi alloy, LaNi$_5$ and more complex alloys such as La$_{0.8}$Nd$_{0.2}$Ni$_{2.5}$Co$_{2.4}$Si$_{0.1}$, FeTi, and Mg$_2$Ni. The anode active material may integrally include other materials that do not directly participate in an electrochemical reaction, such as a carbon coating to improve electronic conductivity.

In conventional electrochemical cells and batteries, swelling and physical distortion of the cathode and anode and particularly of the cathode and anode active materials during electrochemical cell cycling can cause physical damage to the electrochemical cell, such as disconnects between the active materials and other electronically conductive materials present in the electrochemical cell. This causes performance declines over multiple cycles. For example, the electrochemical cell may experience a decrease in capacity over multiple cycles.

The high porosity cathode or anode metal foams of the present disclosure allow cathode or anode active materials coated on the foams room to swell and physically distort during cycling in three dimensions without significantly changing the overall dimensions of the electrode. This minimizes the physical damage caused by cycling and improves electrode and electrochemical cell life, allowing the electrochemical cell to cycle for at least 500 to 1000 cycles, at least 500 to 2000 cycles, at least 1000 to 2000 cycles, or at least 500 to 5000 cycles with a capacity loss of 5% or less or 1% or less as compared to the capacity at the 10$^{th}$ cycle.

The cathode 102 may have a surface 140 having a surface area measured by the dimensions of the cathode 102 around the surface 140 and thus excluding any surface area contributed by pores at the surface 140. The surface area 140 of the cathode 102 may be small compared to the internal surface area of the pores in the cathode 102 or the internal surface area of the pores in the cathode 102 coated by the cathode active material, such as 0.5% or less, 0.1% or less, or 0.08% or less, particularly between 0.5% and 0.0001%, between 0.1% and 0.0001% and between 0.08% and 0.0001%.

Similarly the anode 104 may have a surface 142 having a surface area measured by the dimensions of the anode 102 around the surface 142 and thus excluding any surface area contributed by pores at the surface 142. The surface area 142 of the anode 104 may be small compared to the internal surface area of the pores in the anode 104 or the internal surface area of the pores in the anode 104 coated by the anode active material, such as 0.5% or less, 0.1% or less, or 0.08% or less, particularly between 0.5% and 0.0001%, between 0.1% and 0.0001% and between 0.08% and 0.0001%.

The low ratio of surface area to internal surface area in the cathode 102, the anode 104, or both may also inhibit the formation of dendrites between the cathode 102 and the anode 104 in the electrochemical cell 100.

Figure 2:
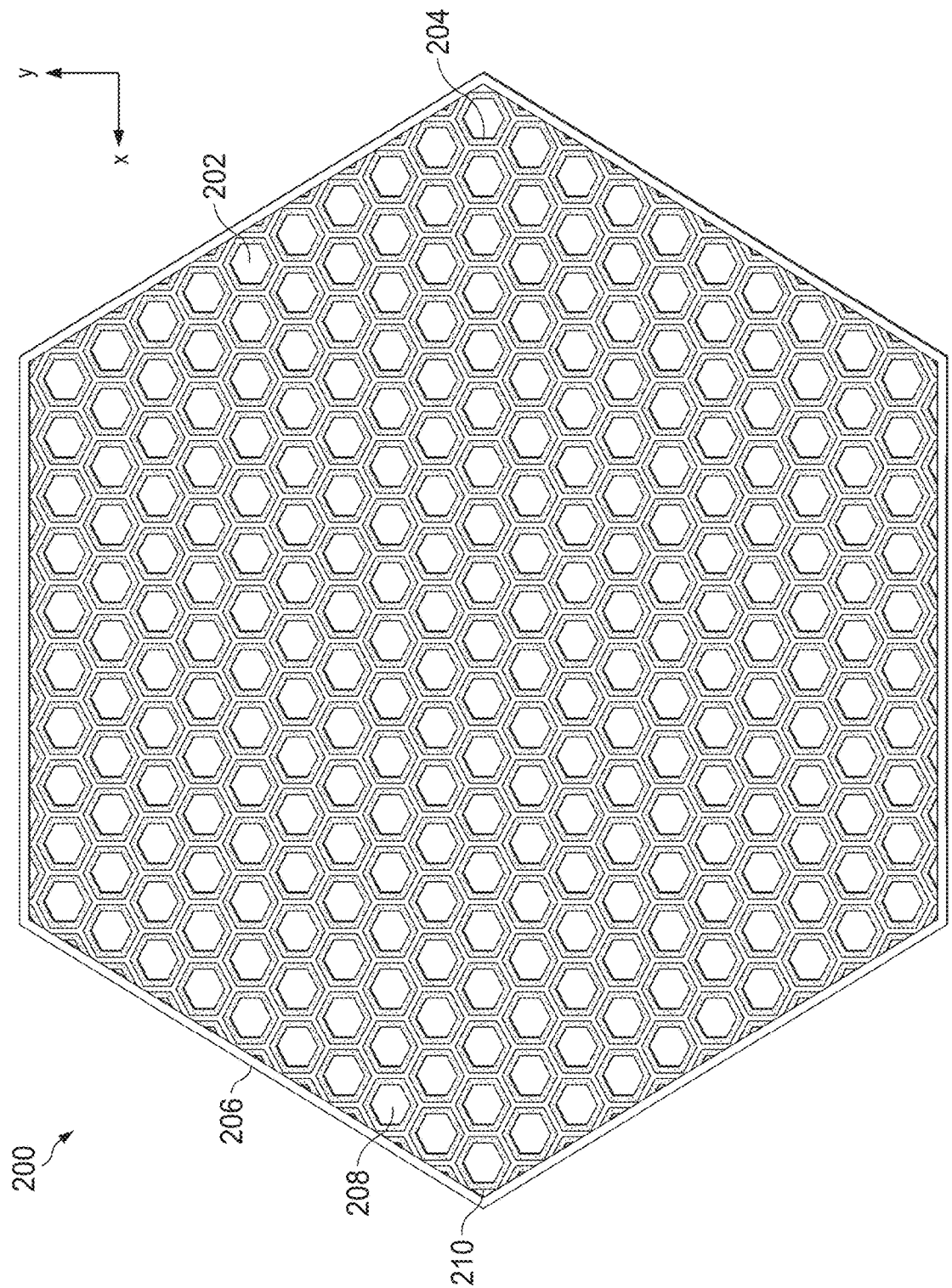
FIG. 2 is a cross-sectional view schematic diagram view of an electrode.

Electrode 200 in FIG. 2 is illustrated in cross-section in an x-y cross-sectional plane. Electrode 200 may be used in an electrochemical cell, such as electrochemical cell 100. Electrode 200, which may be a cathode or an anode, includes a high-porosity base material 206. The high porosity base material 206 includes a plurality of hexagonal cells 202 including walls 210 that form a plurality of pores 208. The pores 208 may include an open channel for electrolyte to pass through while contacting the active material. The pores 208 allow flow of a fluid electrolyte, such as fluid electrolyte 106, through the cathode or the anode. The pores 208 may have an average maximum internal cross-sectional distance, measured from one vertex to the opposite vertex, of between 0.01 mm and 1 mm. The pores 208 may have length that matches the width of the electrode 200 in the direction perpendicular to the cross-sectional plane of the electrode 200, for example between 2 cm and 20 cm or between 5 cm and 10 cm. The walls 210 may have a maximum thickness of between 1 µm and 5 µm.

The electrode 200, when placed in an electrochemical cell, is placed so that the length of the pores 208 is in the direction of fluid electrolyte flow to facilitate flow of the fluid electrolyte through the electrode 200 during cycling of the electrochemical cell. Ideally the fluid electrolyte will be able to flow laminarly through the pores 208, with a given volume of fluid electrolyte remaining in the same pore 208 during its entire transit through the electrode 200. Blocked pores impede electrolyte flow. Accordingly, at least 60%, at least 80%, or at least 90% of all pores 208 in the electrode 200 may be continuously open along a length that matches the width of the electrode 200 in the direction perpendicular to the cross-sectional plane of the electrode 200.

The hexagonal cells 202 are coated with an active material coating 204. The coating may be continuous, as illustrated, or discontinuous. In addition, all hexagonal cells 202 may be coated, as illustrated, or only a portion of the hexagonal cells 202 may be coated. The active material coating may be sufficiently thin to not impede the flow of the electrolyte through the cathode or anode. For example, the average thickness of the active material coating 204 may be no more than 0.1%, 0.5%, 1%, or 2%, or between 0.0001% and 0.1%, 0.5%, 1%, or 2% of the average maximum internal distance of the pores 208.

The high-porosity base material 206 may be particularly able to withstand damage caused by swelling and distortion of the active material because the walls of the hexagonal cells tend to experience similar forces from opposite directions.

Other high-porosity base materials having geometrically-shaped cells are also possible. For example, octagonal, hexagonal, square, rectangular, rhomboid, triangular, ovoid, oblate spherical, or circular cells may be used. Such cells may have maximum internal cross-sectional distances similar to the hexagonal cells discussed above and similar relative maximum wall thicknesses, lengths, and active material coating thicknesses. Similar proportions of such cells may be unblocked.

The high-porosity base material 206 may be formed using any suitable method, such as 3D printing or laser cutting, including computer numeric control (CNC) laser cutting. The active materials may be coated on the high-porosity base material 206 using any suitable method, such as electroplating, powder impregnation, or electro-deposition of layers.

Figure 3A:
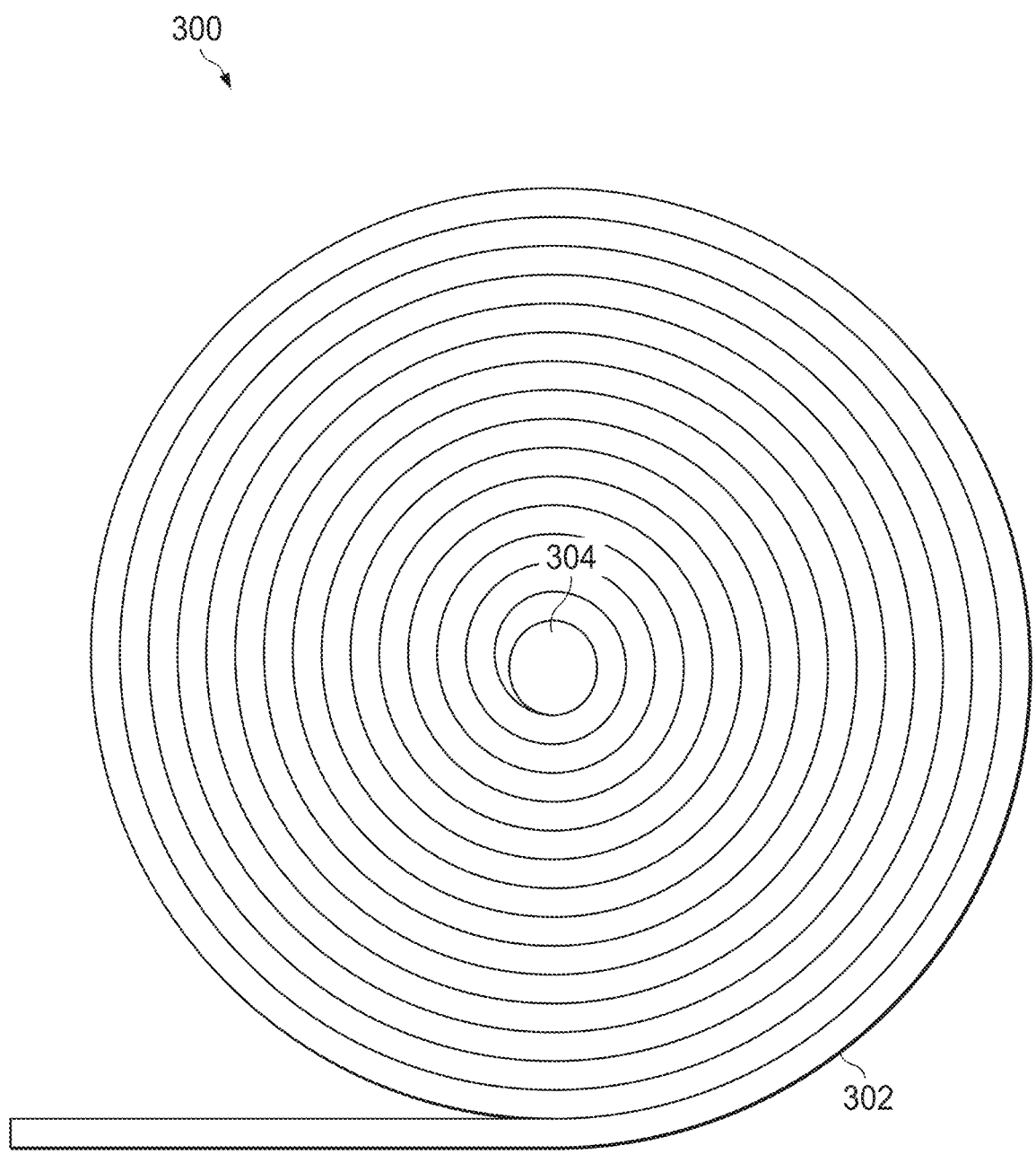
FIG. 3A is a side view schematic diagram of a rolled foam sheet electrode.
Figure 3B:
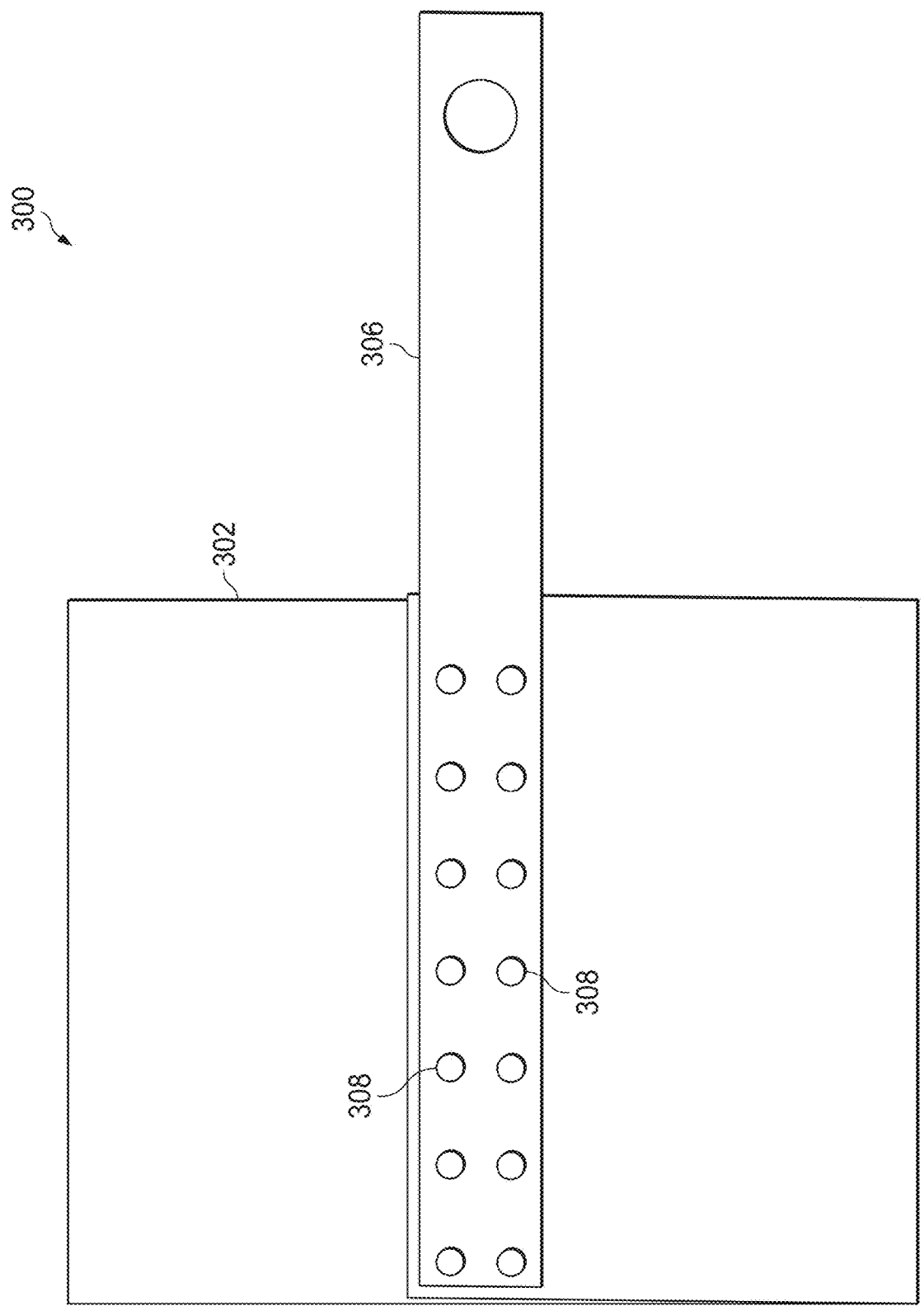
FIG. 3B is a top view schematic diagram of the rolled foam sheet electrode of FIG. 3A.

FIG. 3A is a side view of a rolled electrode 300. FIG. 3B is a top view of the same electrode. Such a rolled electrode might be used in an electrochemical cell having the format of electrochemical cell 100, but it is also suitable for other formats, such as variations of jelly-roll formats. The rolled electrode 300 includes a high-porosity material 302. For example, the high-porosity material 302 may include metal foam, such as a Ni, Fe, Cu, or Al foam, or carbon foam. The high-porosity material 302 may be in the form of at least one thin sheet. The thin sheet may have a thickness of between 0.5 mm and 3 mm, particularly between 1.0 and 2.0 mm. The high-porosity material 302 may have an average maximum pore internal distance of between 0.01 mm and 1.0 mm. The high-porosity material 302 includes an active material coated in its pores. The pores may be entirely or partially coated and all or only a portion of the pores may be coated. The active materials may be coated using any suitable method, such as electroplating, powder impregnation, or electro-deposition of layers.

The rolled electrode 300 may have a diameter that is adjustable by the number of times the high-porosity material 302 is rolled.

The rolled electrode 300 may include an internal rod 304 to facilitate rolling of the high-porosity material 302. The internal rod 304 may be electronically insulative, or it may be electronically conductive. The internal rod 304 may be resistant to degradation during cycling of an electrochemical cell. For example, it may be acrylic.

The rolled electrode may further include a conductive strip 306, which may include a metal, such as Ni, Fe Cu, or Al, or C. If the conductive strip 306 and the high-porosity material 302 are both metals, then the conductive strip 306 may be welded to the high-porosity material 302 at one or more weld points 308.

The electrode 300 may be positioned in an electrochemical cell, such as electrochemical cell 100, so that the fluid electrolyte flows through the electrode 300 in the directions 410 during cycling of the electrochemical cell.

The following formula may provide spiral roll-length:

$$L = \pi N \cdot (D - D_o)(D_o + h \cdot (N-1))$$

Where: $D_o$=an inner diameter of the roll, which may be the diameter of an inner rod 304, if present,
$h$=the thickness of the high-porosity material 302, the active material, and any separator, and
$N$=the number of spiral turns=$(D - D_o)/2h$.

The surface area of active material in such an electrode 300 is the length of the high-porosity material multiplied by its width and the volume of the active material in such an electrode 300 is the surface area of the active material multiplied by the active material thickness. The electrode 300, therefore, has an active material volume that may be at least 3 times, at least 4 times, at least 5 times, between 2 times and 6 times, or between 2 times and 5 times greater than a rolled-foil electrode with the same overall dimensions, but not including a high-porosity material. This translates into similar increases in energy density for an electrochemical cell containing the electrode 300.

Figure 4A:
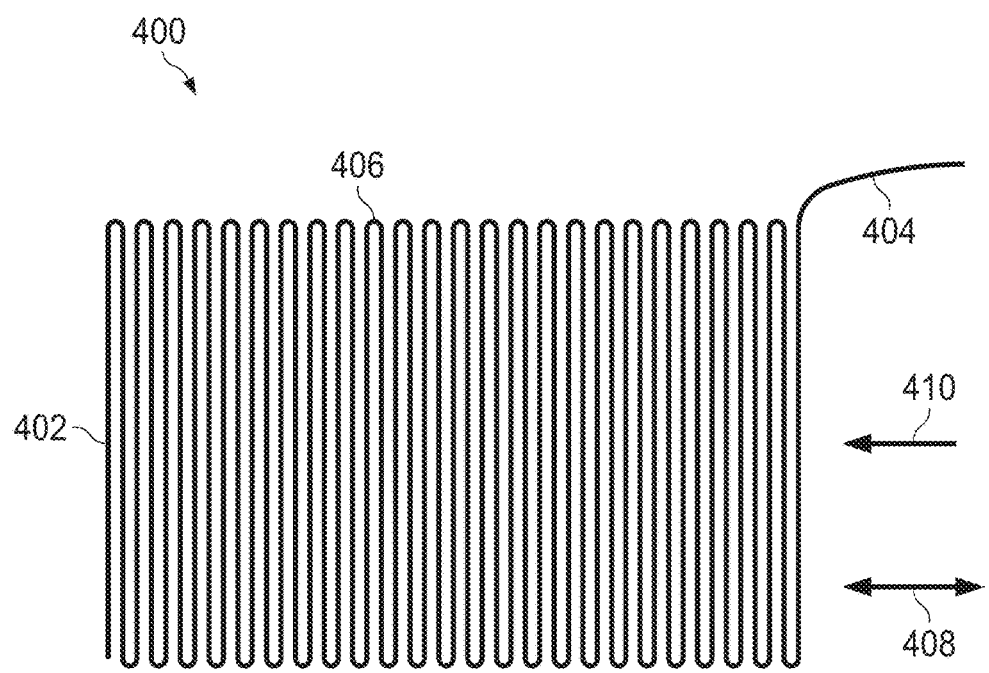
FIG. 4A is a side-view schematic diagram of a woven wire mesh (WWM) electrode.
Figure 4B:
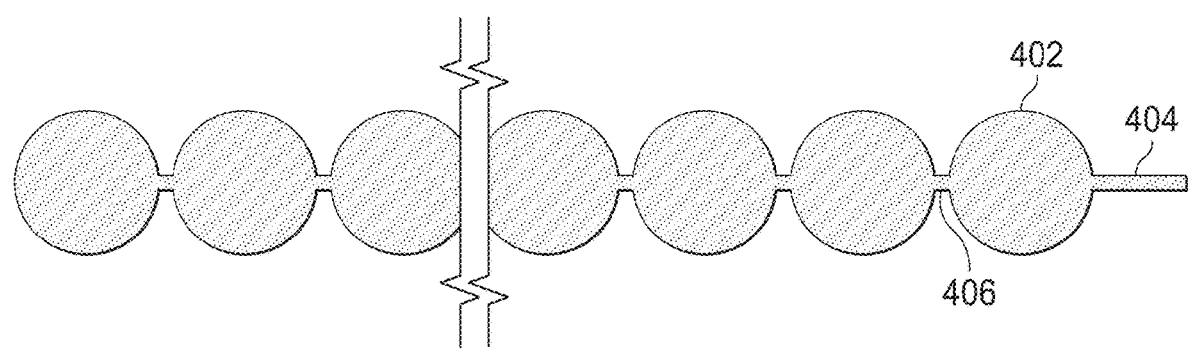
FIG. 4B is a top view schematic diagram of the WWM used in electrode of FIG. 4 before folding into the electrode.

FIG. 4A is a side view of a woven wire mesh (WWM) electrode 400. The electrode may include at least one WWM, as illustrated, folded at fold points 406 to form layers 402, or it may contain a plurality of WWM sheets that are not folded. The WWM may be laser cut to facilitate folding. FIG. 4B illustrates a folded WWM prior to folding at fold points 406.

The WWM contains pores. For example it may be a highly-porous material. The WWM electrode 400 may further include an electrically conductive connector 404, to allow electronic connection to an external circuit. Electrode 400 may contain between 10 and 100 or, more particularly, between 20 and 50 layers 402. The layers 402, particularly if not formed from a folded WWM, may contain internal electrically conductive connectors between layers 402. The WWM 402 may have an average maximum pore internal distance of between 0.01 mm and 1.0 mm, such as an average pore diameter of 2.5 mm. The WWM 402 includes an active material coated in its pores. The pores may be entirely or partially coated and all or only a portion of the pores may be coated. The active materials may be coated using any suitable method, such as electroplating, powder impregnation, or electro-deposition of layers.

Figure 4C:
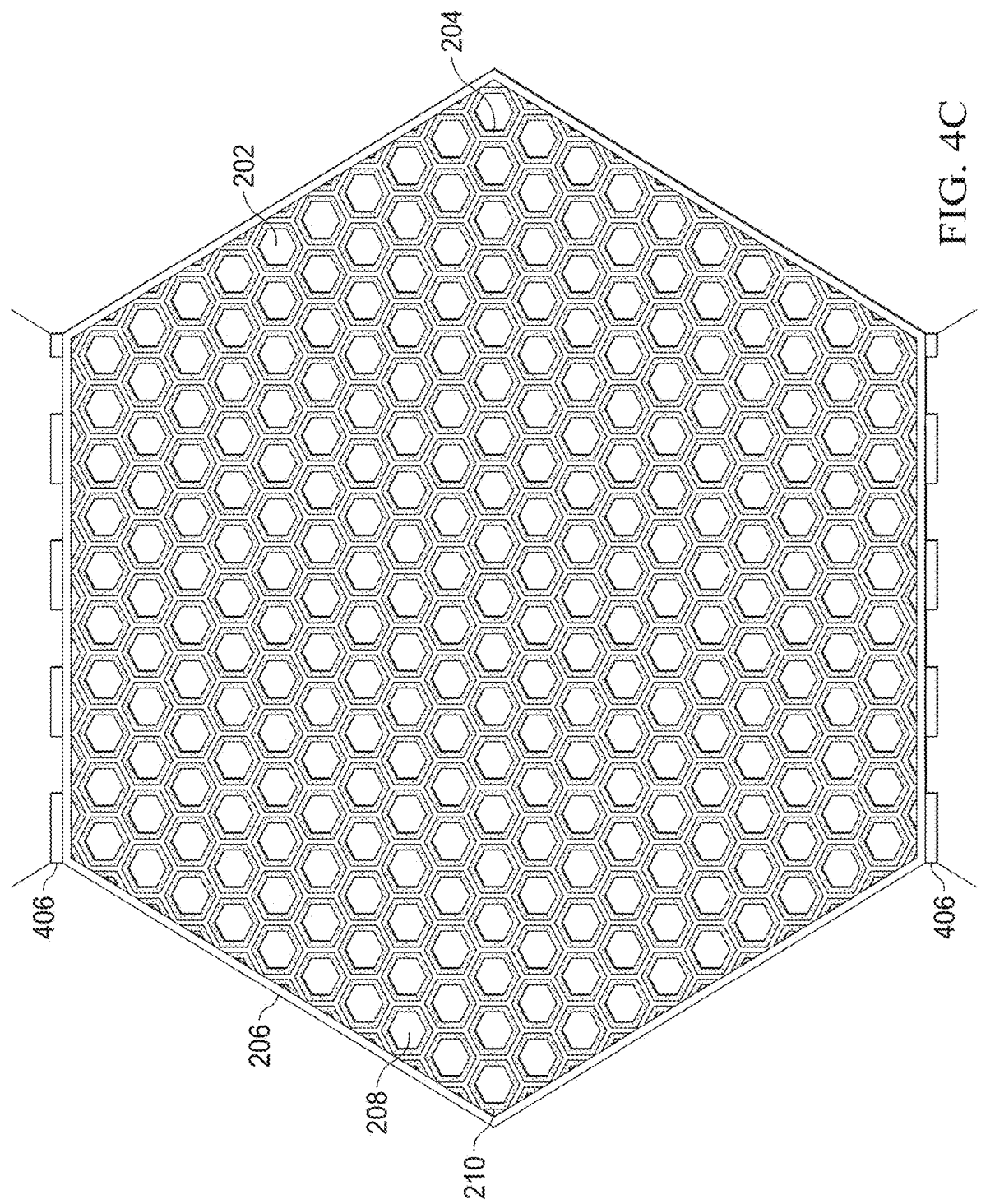
FIG. 4C is a top view of a cell electrode of the type illustrated in FIG. 2, modified for use in a WWM electrode of FIGS. 4A and 4B.

The WWM 402 may have spaces between the layers as illustrated in FIG. 4. These spaces may further accommodate swelling and distortion of the active material in lateral direction 408 during cycling. The electrode 400 may be positioned in an electrochemical cell, such as electrochemical cell 100, so that the fluid electrolyte flows through the electrode 400 in direction 410 during charge and in the opposite direction during discharge.

The material in electrode 200 may also be folded in the same manner as the WWM of electrode 400, for example at fold points 406 as illustrated in FIG. 4B, or simply as detached layers. In such an example, the pores 208 may have a length equal to the width of each layer, rather than the entire electrode.

The fluid electrolyte 106 may be in the form of a liquid. The fluid electrolyte may include a solvent, which typically does not contain the working ion or does not contribute working ions to the electrochemical reactions of the electrochemical cell 100, and a solute, which does contribute the working ion to the electrochemical reactions of the electrochemical cell 100. Mixtures of multiple solvents and multiple solutes are common in electrolytes. Certain electrolytes may also have more complex forms that are not solvent-solute in nature. For example, such electrolytes may include miscible materials. The flow-through nature of the electrochemical cell 100 may be particularly well suited for such electrolytes or for electrolytes where the solute does not readily remain in solution, due to the mixing provided by flow.

The electrolyte may include an aqueous or non-aqueous solvent. Aqueous electrolytes may include an alkali metal hydroxide, such as KOH, LiOH, or NaOH, or mixtures of these hydroxides. Non-aqueous electrolytes may include organic carbonate, organic ester, organic ether, ionic liquid, and polymer solvents. Organic carbonates and organic esters may include ethylene carbonate, propylene carbonate, butylene carbonate, γ-butylene carbonate, γ-valerolactone, N-methyl-2-oxazolidinone, dimethyl carbonate, diethyl carbonate, ethyl methyl carbonate, ethyl acetate, methyl butyrate, or ethyl butyrate. Organic ethers may include 2-methyl-tetrahydrofuran, dimethyl ether, diethyl ether, tetrahydrofuran, 2-methyl-tetrahydrofuran, 1,3-dioxolane, 4-methyl-1,3-dioxolane, or 2-methyl-1,3-dioxolane. By way of yet another example, the polymer electrolytes used as electrolyte solvent may include poly(ethylene oxide), polyacrylonitrile, poly(methyl methacrylate), poly(vinylidene fluoride), poly(vinylidene fluoride co-hexafluoropropylene), polyethylene glycol, polyethylene glycol dimethacrylate, polyethylene glycol diacrylate, or poly(ethylene terephthalate).

Suitable solvents or other working ion sources include working ion salts. For example lithium salts, such as $LiPF_6$, $LiBF_4$, or $LiClO_4$, may be present when the working ion is lithium. Sodium salts, such as sodium difluoro(oxalate) borate ($C_2O_4BF_2Na$), $NaPF_6$ or $NaClO_4$, may be present when the working ion is sodium. Potassium salts, such as KPF6 or potassium bis(fluorosulfonyl)imide, may be present when the working ion is sodium.

For electrochemical cells in which the working ion is hydrogen, a solvent-solute electrolyte or other complex electrolyte is often not needed. For example, KOH may simply function as the electrolyte in a hydrogen ion electrochemical cell, and is often the most cost-effective choice.

The viscosity of the fluid electrolyte directly impacts the fluid electrolyte's resistance to flow through porous media, such as the electrodes. As a result, the fluid electrolyte pressure drop across an electrode or across both electrodes of the electrochemical cell is influenced by viscosity of the fluid electrolyte, with more viscous fluid electrolytes exhibiting a greater pressure drop in either case. A more powerful pump may be needed to achieve an adequate or set flow rate of a more viscous fluid electrolyte within an electrochemical cell and if a less viscous fluid electrolyte were used.

Aqueous fluid electrolytes, such as alkali metal hydroxide electrolytes, may exhibit a viscosity close to that of water at room temperature (20° C.). For example, aqueous alkali metal hydroxide electrolytes, such as KOH, may exhibits viscosity of between 1 and 3 mPa/s at room temperature. Organic liquid electrolytes may have a viscosity between 0.5 and 1 mPa/s, while emulsions may have a viscosity of between 2 and 20 mPa/s.

The viscosity of all fluid electrolytes will vary, sometimes substantially, with temperature. Generally viscosity of a given fluid electrolyte will increase with decreasing temperatures and decrease with increasing temperatures. Different solutes or other materials present in a fluid electrolyte may have different effects on the viscosity and viscosity change with temperature for a given solvent or volumetrically greatest component of a fluid electrolyte. Accordingly, a given fluid electrolyte, including any solutes or other volumetrically minor components of the fluid electrolyte may be used in an electrochemical cell of the present disclosure in order to provide an optimal or set fluid electrolyte flow rate at given temperature ranges, or to allow the electrochemical cell to function even at extreme temperatures.

The combinations of cathode active material, anode active material, and electrolyte may be based on known electrochemical cell principles so that the working ion may participate in electrochemical reactions that allow the electrochemical cell to function. For example, the anode and cathode may give rise to a given theoretical voltage, and the electrolyte may be an electrolyte that is expected to be stable at that given voltage.

Although FIGS. 1A and 1B show a single electrochemical cell, the disclosure also includes a flow-through rechargeable battery including a plurality of electrochemical cells with continuous fluid electrolyte flow. FIG. 5 illustrates such a flow-through rechargeable battery 500. The battery 500 is illustrated with five electrochemical cells 100 in a stack, but a flow-through rechargeable battery may include between 2 and 1000, between 2 and 500, between 2 and 100, between 2 and 50, between 2 and 20, between 2 and 5, or between 2 and 10 electrochemical cells 100. The number of electrochemical cells 100 in the stack is limited only by the increase in mechanical power required to overcome the pressure-drop in passing the fluid electrolyte through the porous electrodes. The mechanical power required scales in proportion to the total battery power, however, so the relative efficiency of the battery remains the same.

The electrochemical cells 100 at the ends of the stack are connected to closed loop 114 and electrochemical cells 100 are connected internally within the stack by internal loops 502 to allow flow of the fluid electrolyte 106 through the stack of electrochemical cells 100. Similarly, the electrochemical cells 100 at the ends of the stack are connected to external circuit 136 and the electrochemical cells 100 are connected internally within the stack by internal circuits 504 to allow electronic conduction between the electrochemical cells 100 and an outside element, such as electrical load 138.

FIG. 5 illustrates the electrochemical cells 100 connected electronically in series, such that the cathode 102 of one electrochemical cell 100 is connected by an internal circuit 504 to the anode 104 of the next electrochemical cell 100 in the stack, but other electronic connections, such as connections in parallel, are possible depending on the placement of internal circuits 504. The path of flow of the fluid electrolyte 106 through the stack of electrochemical cells 100 need not necessarily match the path of the electronic circuits 504.

When the flow-through electrochemical cells 100 are connected in a flow-through rechargeable battery 500, they are at the same electrical potential, so it is not problematic for the fluid electrolyte 106 to pass from one cathode directly to the next anode along the stack.

FIG. 5 further includes an external reservoir 508 in which the electrolyte 106 may be stored, typically when not flowing through the electrochemical cells 100. The closed loop 114 may include one or more valves 506 which may be opened or closed to direct the electrolyte 106 in a circuit through the closed loop 114, or into the external reservoir 508, using the pump 112. The external reservoir may be insulated, heated, cooled, or any combinations thereof to protect the electrolyte 106 against extreme temperatures. Although an external reservoir 508 and valves 506 are shown in FIG. 5 in the context of a battery 500 containing multiple electrochemical cells 100, they may also be used in other contexts, such as with an electrochemical cell of FIGS. 1A and 1B.

An electrochemical cell or battery according to the present disclosure may also contain or be connected to battery safety and control components. For example, the electrochemical cell or battery may contain or be connected to an external temperature controller that may monitor and control the temperature of the fluid electrolyte, for example using a thermostat and an external heat-exchanger. Alternatively, and electrolyte heater or cooler may be installed in or around closed loop. Temperature monitoring and control may avoid the electrochemical cell or battery operating at destructive temperatures. Temperature monitoring systems including a thermostat and a charging controller may be able to, for example, stop charging if the battery overheats during charging. Temperature monitoring systems may also prevent discharge, charge, or both if the battery temperature is too low. For example, both charge and discharge may be prevented at temperatures at which the fluid electrolyte is too viscous for proper flow.

Temperature monitoring systems may monitor electrochemical cell or battery temperatures, external temperatures, or both and also control the pump and valves in the closed loop to direct the electrolyte into the external reservoir when the electrochemical cell or battery is not in operation and extreme temperatures are present.

As another example, the electrochemical cell or battery may contain a flow rate monitor that may be coupled to the pump in such a way that flow rate may be adjusted. The flow rate monitor may also be able to prevent charge or discharge if flow rate drops below a set rate.

As yet another example, the electrochemical cells or battery may contain a pump switch, which automatically directs the flow of the fluid electrolyte in the appropriate direction. For example, the battery may contain components able to detect if a charging current is being applied, for example using a current meter or a voltage meter. The pump switch may automatically be switched to cause the pump to direct flow of the fluid electrolyte in a direction appropriate for charging when a charging current is detected. The battery may also contain components able to detect if a load is applied to the external circuit or if the external circuit has been completed without a charging current, for example using a current meter or a voltage meter. The components able to detect if a load is applied or if the external circuit is completed may be the same as the components able to detect if a charging current is being applied. The pump switch may automatically be switched to cause the pump to direct flow of the fluid electrolyte in a direction appropriate for discharging when a load or a complete external circuit without a charging current is detected. The pump switch may also be able to detect if the external circuit is broken and stop flow of the fluid electrolyte when this occurs, for example immediately or after a set period of time.

Battery safety and control components may be simple physical devices, such as a heat-exchanger, or they may include or be managed by a processor and memory that, when the processor executes instructions stored in the memory, monitor or control battery parameters, such as temperature and electrolyte flow rate.

FIG. 1A illustrates an electrochemical cell 100 during discharge when the active material is an alkali metal ion active material. The fluid electrolyte 106 is pumped in direction 118 by the positive-displacement pump 112 rotating in direction 120. Electrons are conducted along external circuit 136 in direction 122 through electrical load 138, such as a device being powered by the electrochemical cell 100. The working ion, in this example lithium ion, is conducted in direction 124 between the anode 104 and the cathode 102. Electrochemical reactions in the anode 104 free lithium ions from the anode active material, while electrochemical reactions in the cathode 102 capture lithium ions in the cathode active material.

FIG. 1B illustrates and electrochemical cell 100 during charge when the active material is an alkali metal ion active material. The fluid electrolyte 106 is pumped in direction 128, which is opposite direction 118, by the positive-displacement pump 112 rotating in direction 126. Electrons are conducted along external circuit 136 in direction 130 through charger 144, which may be connected to an external power source. The working ion, in this example lithium ion, is conducted in direction 134, which is opposite direction 124, between the cathode 102 and the anode 104. Electrochemical reactions in the cathode 102 free lithium ions from the cathode active material, while electrochemical reactions in the cathode 104 capture lithium ions in the anode active material.

Flow of the fluid electrolyte 106 through the anode 104 and the cathode 102, also in direction 124, or flow of the fluid electrolyte 106 through the cathode 102 and the anode 104, also in direction 134, magnifies the effective ionic mobility of the working ion in the anode 104, the cathode 102, or, typically, both, with flow at higher rates having a greater effect. Higher working ion mobility in one or both electrodes may reduce ohmic losses in the electrolyte during charge, discharge or, typically, both.

For hydrogen ion electrochemical cells, often mobility of the hydroxyl ion in the opposite direction of the hydrogen ion controls charge and discharge, such that the flow may need to be in the opposite direction than if the electrochemical cell contained alkali metal ion-based active materials.

The flow rate of the fluid electrolyte 106 through the anode 104 and the cathode 102 may be fixed or it may vary. For example, the flow rate may vary depending on whether the electrochemical cell 100 is being charged or discharged. In particular, a faster flow rate may be used during charge to facilitate faster charging, to take advantage of the external power source, or both. The flow rate may also vary depending on battery parameters, such as the number of cycles the battery has undergone. It is well-known that electrochemical cells often behave differently during the first cycle, or even the first two or first five cycles as the electrodes undergo changes induced by use. A different flow rate may be used during an electrode conditioning period to help the electrodes reach a state more useful for later electrochemical cell performance, or to avoid damages to the electrodes. Similarly, as the electrochemical cell ages and experiences performance losses the flow rate may be adjusted to compensate or to slow down the rate of performance loss.

Flow of the fluid electrolyte 106 may occur at times other than when the electrochemical cells is being charged or discharged to power an electrical load 138. For example, the pump 112 may continue to operate and the fluid electrolyte 106 may continue to flow as long as a charger 144 is connected to the electrochemical cell 100, even if charging is complete. In another example, the pump 112 may continue to operate for a period of time after stops.

During extreme temperatures, such as temperatures not between −40° C. and 100° C., −40° C. and 90° C., or −20° C. and 90° C., the electrochemical cell or battery may be damaged by charging or discharging. Control components, including temperature sensors, may cause external circuit 136 to be interrupted during extreme temperatures to prevent the electrochemical cell or battery from being charged or discharged or both.

When the electrochemical cell 100 is not charging or discharging, the pump 112 may pump the fluid electrolyte 106 into an external reservoir, such as the external reservoir 508 shown in FIG. 5. Valves, such as valves 506 shown in FIG. 5, may be opened or closed to cause the fluid electrolyte 106 to flow into the external reservoir. The change in direction of flow may happen automatically when the electrochemical cell 100 is no longer connected to a charger 144 or an electrical load 138, or in response to an external signal. Similarly, when the electrochemical cell 100 is later connected to a charger 144 or an electrical load 138, or in response to an external signal, the pump 112 may pump the fluid electrolyte 106 from the external reservoir 508 into the closed loop 114, with the valves 506 being opened or closed appropriately. In some instances, the fluid electrolyte 106 may be pumped into or out of the external reservoir 508 in response to the temperature of the electrochemical cell 100 or battery 500, or to the external temperature, so that the electrochemical cell 100 or the battery 500 is less likely to be damaged by extreme temperatures. This may be particularly useful if the external reservoir 508 is insulated, heated, cooled, or any combinations thereof. Pumping the fluid electrolyte 106 into the external reservoir 508 when charging is complete may also be an effective way to prevent self-discharge of the electrochemical cell or battery.

It is possible that an electrochemical cell or battery of the present disclosure may experience some movement of solid materials out of the cathode or anode during initial cycles, such as during the first cycle, first two cycles, or first five cycles. For example, solid fragments of the active material coating or of the high-porosity base materials may break free in response to flow of the electrolyte. It may be advantageous to remove these materials from the electrochemical cell or battery. Filters in the closed loop, between the electrodes, or both may remove these materials. The electrodes may also be subject to pre-treatments with a flowing fluid, such as the fluid electrolyte or a similar material, prior to assembly into an electrochemical cell to help avoid this issue, which is not typically faced by conventional electrochemical cells with static electrolyte.

Once the working ions are carried inside the pores of the electrodes, the local electric field is negligible and will not cause further movement of the working ions, but flow of the fluid electrolyte through the pores continues to move the working ion. This moves the working ions to active materials located far from the surfaces of the electrodes, allowing more efficient and complete use of the active materials. In a flow-through electrochemical cell of the present disclosure, at least 90%, at least 95%, at least 99%, or at least 99.9% of the active material in the cathode, anode, or both, is available for reaction with the working ion during charge or discharge or both. This allows the electrochemical cell to have an actual capacity that is at least 80%, at least 90%, at least 95%, at least 99%, or at least 99.9% of its theoretical capacity, when measured after ten cycles.

Batteries and methods of the present disclosure may be used in any device in which a rechargeable battery is suitable, including cars, trucks, motorcycles, delivery vehicles, assisted bicycles, scooters, military ground vehicles, forklifts, construction equipment, industrial equipment, ships, ferry boats, submarines, aircraft, autonomous vehicles, wheelchairs, personal mobility devices, robotic assist devices, medical equipment, home storage devices, and grid storage devices.

EXAMPLES

The following examples are provided to further illustrate the principles and specific aspects of the invention. They are not intended to and should not be interpreted to encompass the entire breath of all aspects of the invention.

Example 1: Lithium Ion Flow-Through Electrochemical Cell

A flow-through electrochemical cell may be constructed and operated as illustrated in FIGS. 1A and 1B.

The ionic mobility of lithium ions in water at 300 Kelvin (room temperature) is $4 \times 10^{-8}$ $m^2/(Vs)$. If the anode and cathode are chosen such that the discharge voltage of the electrochemical cell is 3.6 V and a typical separator having a thickness of 50 μm, the electric field within the electrochemical cell is 3.6 V/(50×10$^{-6}$ m)=7.2×10$^4$ V/m. The ion drift velocity is then $4 \times 10^{-8}$ $m^2/(Vs) \times 7.2 \times 10^4$ V/m=2.9×10$^{-3}$ m/s=2.9 mm/s. If the fluid electrolyte flows through the electrochemical cell at a linear fluid flow rate of 2.9 cm/s, then the effective ionic mobility in the form of ionic current will be increased by a factor of ten. Ionic mobility controls the electrical current, so the discharge current will be multiplied by a factor of ten as well. Charging voltage is similar or identical to discharging voltage, so a similar effect will be seen during charging.

The transit time across the separator, 50 μm/2.9×10$^{-3}$ m/s=17.2 milliseconds in the absence of any flow, but only 1.72 milliseconds with 2.9 cm/s flow rate. This may allow the electrochemical cell to respond more quickly to changes in the load current than a similar cell without a flow-through fluid electrolyte.

This means that the cell can respond much faster to changes in load current which may be very valuable in some applications.

A typical flow-through cell for an automotive application may have electrodes with an overall diameter of 12.7 cm. The surface area of the electrode facing electrolyte flow is 127 cm$^2$. A linear flow rate of 2.9 cm/s requires a 127×2.9/1000=0.37 L/s volumetric flow-rate.

In current lithium-ion cells the typical thickness of active material t=0.005 cm. This allows us to calculate the effective area/volume ratio of a porous electrode as $\pi/2d=\pi/6t=105$ cm$^{-1}$. If the electrodes contain a high-porosity base material, such as a cylindrical metal foam material with a diameter D=12.7 cm and a width W=12.7 cm, the electrode will have a volume=$\pi(12.7)^3/6$=1073 cm$^3$. The active material surface area will be 105×1073=112,630 cm$^2$. Multiplying by the thickness gives the total volume of active material of 563 cm$^3$ or 52% of the total electrode volume.

If a rolled foam sheet electrode is used with D=12.7 cm, Do=1.7 cm, and h=0.023 cm, then applying the formula L=$\pi$N·(D−Do)(Do+h·(N−1)), then L=2700 cm.

The area of active material is the length multiplied by the width W, giving a total of 34,290 cm$^2$. The volume of active material is the area times the active material thickness of 0.005 cm. This gives a total volume of active material of 172 cm$^3$.

Example 2: Ni-Foam Flow-Through Batteries

Figure 1C:
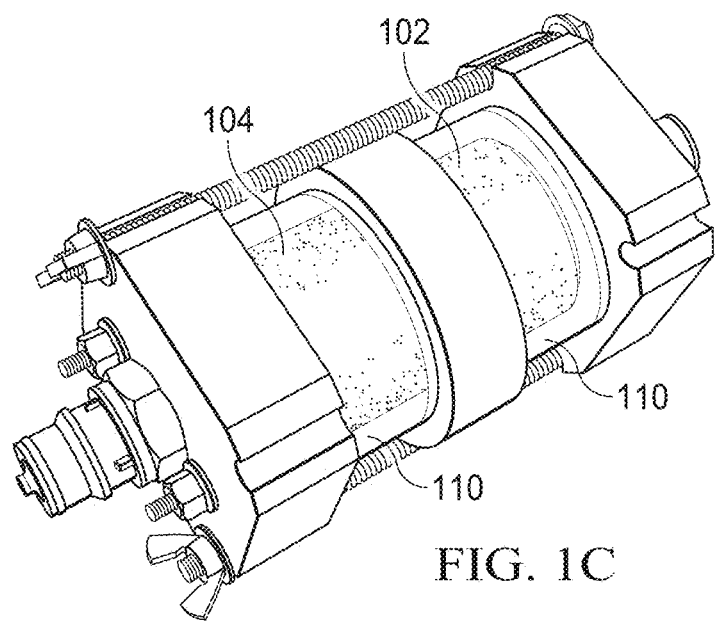
FIG. 1C is a photographic image of a portion of a nickel-metal hydride (NiMH) rechargeable electrochemical cell according to FIGS. 1A and 1B.
Figure 1D:
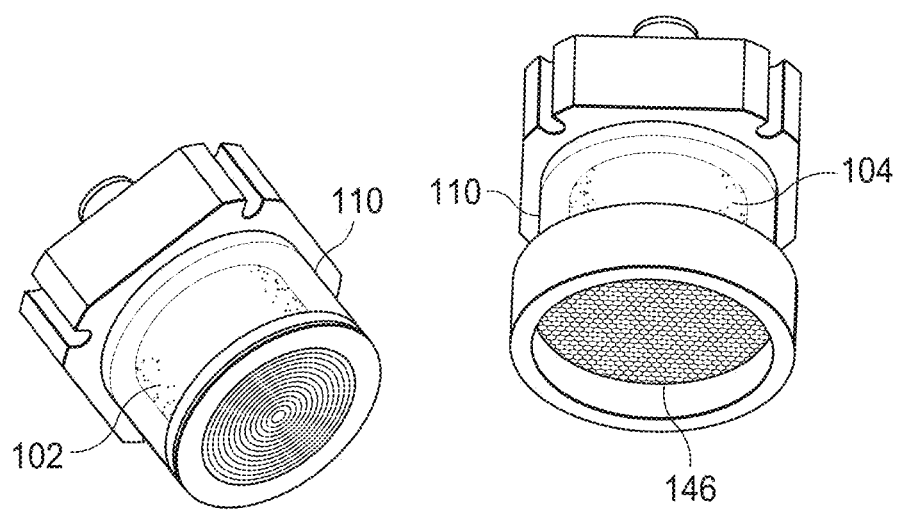
FIG. 1D is photographic image of the electrodes of FIG. 1D.
Figure 3C:
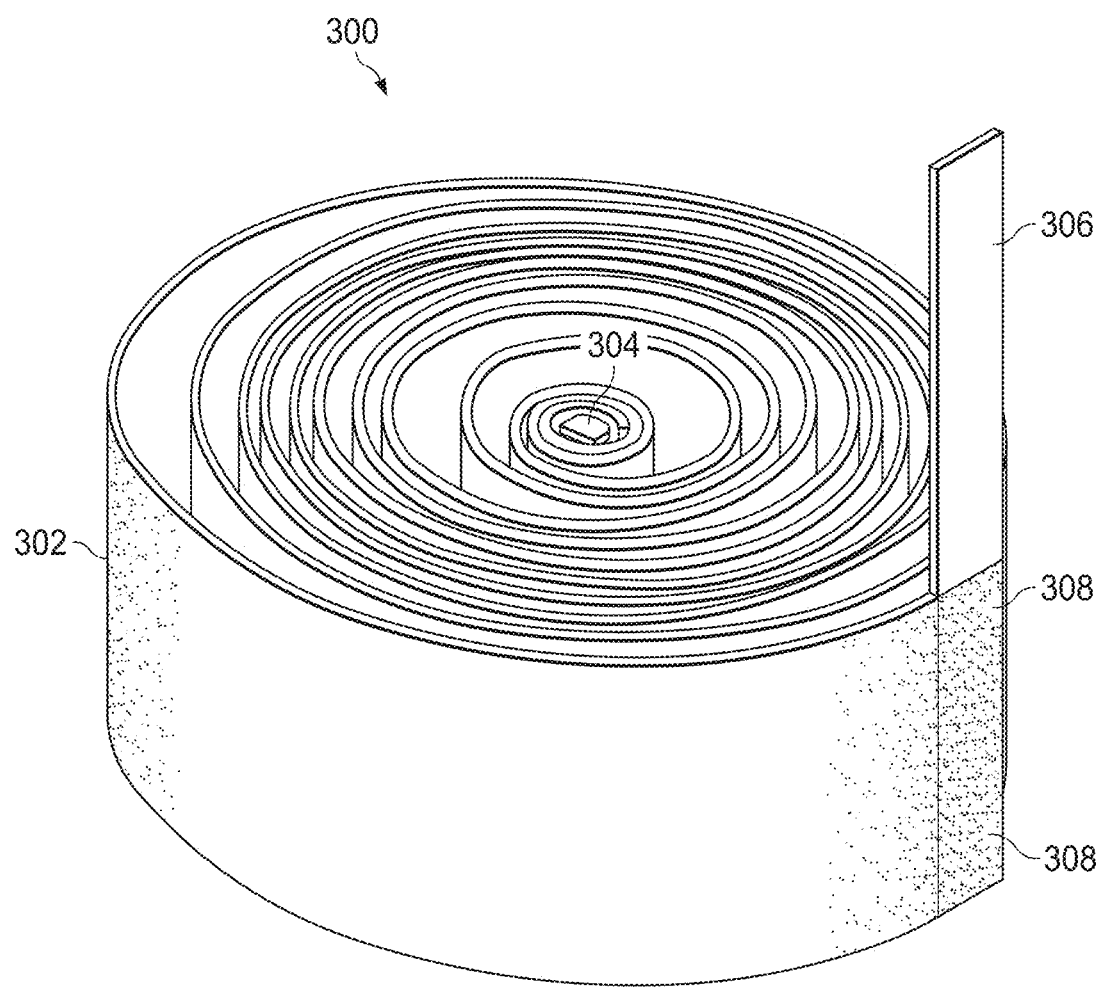
FIG. 3C is a photographic image on a rolled foam sheet electrode according to FIGS. 3A and 3B and of the type used in the electrochemical cell of FIGS. 1C and 1D.

Nickel-metal hydride cells (NiMH) and nickel-cadmium (NiCd) electrochemical cells may use a Ni metal foam cathode base material impregnated with a NiMH cathode active material. An example of such material, prepared using electroplating, is provided in FIG. 3C, which has a structure as described in FIGS. 3A and 3B. In such an electrode, a suitable amount of Ni(OH)$_2$ electroplated into the Ni metal foam is between 0.01 g/cm$^3$ and 2.4 g/cm$^3$ weight of Ni(OH)$_2$ per unit volume of foam. The electrode portion of an electrochemical cell containing this cathode is illustrated in FIGS. 1C and 1D.

The anode may include a high-porosity titanium/nickel alloy, such as metal foam, which electrochemically reacts with hydrogen ions. The anode may also include small, typically less than 1%, less than 0.5%, less than 0.1%, or between 0.0001% and 1%, 0.5%, or 0.1% rare earth metals to create a more open crystal lattice for enhanced hydrogen storage. Suitable rare earth metals include lanthanum, cerium, neodymium, vanadium, and praseodymium. In the case of NiMH cells, the anode may include a lower-porosity metal rather than a high-porosity material because the metal acts as the anode active material. Specifically, sintered metal powder with a net porosity of between 20% and 30% may be used because it maximizes the amount of metal alloy and therefore stores more hydrogen ion. Any porosity that facilitates permeability sufficient to allow electrolyte flow at a set rate is sufficient. The electrode portion of an electrochemical cell containing a high-porosity titanium/nickel alloy anode is illustrated in FIGS. 1C and 1D.

The hydrogen ions actually dissolve in the anode metal, forming a metal hydride solid solution. It is possible for the hydrogen density in the solid metal to be two times higher than in liquid hydrogen. This high volumetric efficiency is achieved because there can be several times as many hydrogen ions as metal atoms in the solid solution, allowing the metal-hydride cell to have potentially one of the highest energy densities of all possible battery chemistries. For example, in LaNi$_5$ types of alloys, there can be six Hydrogen atoms incorporated into the metal for every Nickel atom.

The electrolyte in the NiMH cell may be concentrated aqueous KOH. The mobile species is likely the hydroxyl ion, with an aqueous mobility of 20.64×10$^{-8}$ m$^2$/V×s, which travels between anode and cathode during charging, and combines with nickel hydroxide in the cathode to form nickel oxyhydride and water. Water is split into hydrogen and hydroxyl ions at the anode. Hydroxyl ion mobility is about five times that of lithium, so the nickel metal-hydride flow-through cell may have a higher electrolyte flow-rate to gain equivalent improvement of current and power rating to that of the lithium-ion version.

The metal foam used in this electrochemical cell may be in the form of a rolled electrode in which the sheet has a thickness in the range of 0.2 to 2 mm and an average pore maximum internal distance of 0.22 mm, corresponding to a typical specification of 110 PPI (pores per inch), along with a porosity of 80-90%. Such a metal foam was used in the electrode portion of an electrochemical cell illustrated in FIGS. 1C and 1D.

The electrode portion of an electrochemical cell illustrated in FIGS. 1C and 1D, containing an anode and a cathode was described in this Example 2, and also containing a separator 146, was connected to a closed loop and pump and filled with a KOH electrolyte. A constant potential difference of +1.4 V was applied between the anode and the cathode, and the charging current was continuously measured. The electrode was charged while the pump was operated at the linear flow rates indicated in FIG. 6 to provide either cathode to anode flow or anode to cathode flow. As FIG. 6 shows, the charging current varied depending on the direction of flow and linear flow rate, indicating that flow of the fluid electrolyte does affect operational parameters of the electrochemical cell. After charging the cell, the open-circuit potential was measured to be +1.2 V.

The above-disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description.

What is claimed is:

1. A flow-through rechargeable electrochemical cell comprising:
    a container housing a porous cathode comprising a high-porosity cathode base material coated with a cathode active material to form a cathode active material surface and a porous anode comprising a high porosity anode base material coated with an anode active material to form an anode active material surface;
    a closed loop fluidly connected to the container;
    a fluid electrolyte in the container and closed loop and comprising a working ion;
    a pump configured to cause the fluid electrolyte to flow through the closed loop, the porous cathode, and the porous anode during discharge of the electrochemical cell;
    wherein a plurality of pores of the porous cathode comprise straight channels with a single cross-sectional geometric shape and have a length equal to the width of the porous cathode in a direction perpendicular to the cross-sectional plane of the plurality of pores of the porous cathode;
    wherein a plurality of pores of the porous anode comprise straight channels with a single cross-sectional geometric shape and have a length equal to the width of the porous anode in a direction perpendicular to the cross-sectional plane of the plurality of pores of the porous anode;
    wherein flow of the electrolyte through the plurality of pores of the porous cathode and in contact with an electrode is parallel to the cathode active material surface for a length of the plurality of pores of the porous cathode and
    wherein flow of the electrolyte through the plurality of pores of the porous anode and in contact with an electrode is parallel to the anode active material surface for a length of the plurality of pores of the porous anode.

2. The flow-through rechargeable electrochemical cell of claim 1, wherein the pump is configured to cause the fluid electrolyte to flow in a second direction, opposite the first direction, during charge of the electrochemical cell.

3. The flow-through rechargeable electrochemical cell of claim 1, wherein the cathode, the anode, or both comprise a high-porosity base material having a porosity between 40% and 99%.

4. The flow-through rechargeable electrochemical cell of claim 1, wherein both the cathode and the anode comprise a high-porosity base material having a porosity between 40% and 99%.

5. The flow-through rechargeable electrochemical cell of claim 1, wherein the cathode, the anode, or both comprise a high-porosity base material coated with an active material and have a porosity between 5% and 50%.

6. The flow-through rechargeable electrochemical cell of claim 1, wherein both the cathode and the anode comprise a high-porosity base material coated with an active material and have a porosity between 5% and 50%.

7. The flow-through rechargeable electrochemical cell of claim 1, wherein the pump is a positive-displacement pump, a peristaltic pump, a rotary-vane type pump, or progressive-cavity pump.

8. The flow-through rechargeable electrochemical cell of claim 1, wherein the pump is configured to pump the fluid electrolyte through the electrochemical cell at a linear flow rate between 0.01 cm/s to 100 cm/s.

9. The flow-through rechargeable electrochemical cell of claim 1, wherein the cathode, the anode, or both comprise a high-porosity material having an internal surface area to volume ratio between 1/d and 6/d, in which d is the average maximum internal distance within a pore.

10. The flow-through rechargeable electrochemical cell of claim 1, wherein the cross-sectional geometric shape is octagonal, hexagonal, square, rectangular, rhomboid, triangular, ovoid, oblate spherical, or circular.

11. The flow-through rechargeable electrochemical cell of claim 10, wherein the pores have a length between 2 cm and 20 cm in a direction perpendicular to a cross-sectional plane of the pores.

12. The flow-through rechargeable electrochemical cell of claim 10, wherein at least 60%, at least 80%, or at least 90% of all pores in the electrode are continuously open along their respective lengths.

13. The flow-through electrochemical cell of claim 10, wherein the electrode comprises between 10 and 100 layers of stacked, folded, or stacked and folded high-porosity material.

14. The flow-through rechargeable electrochemical cell of claim 10, wherein the cathode, the anode, or both comprise a high-porosity material comprising pores having an average cross-sectional maximum internal distance of between 0.01 mm and 1.0 mm.

15. The flow-through rechargeable electrochemical cell of claim 1, wherein the working ion comprises an alkali metal ion.

16. The flow-through rechargeable electrochemical cell of claim 1, wherein the working ion comprises hydrogen ion ($H^+$) or hydroxyl ($OH^-$) ion.

17. The flow-through rechargeable electrochemical cell of claim 16, wherein the anode comprises a metal operable to form a solid solution of the hydrogen ion.

18. The flow-through rechargeable electrochemical cell of claim 1, wherein electrochemical cell further comprises a separator comprising an electronically insulating permeable membrane configured to allow passage of the working ion and flow of the fluid electrolyte through the membrane.

19. A flow-through rechargeable battery comprising:
a plurality of electrochemical cells each comprising:
a container housing a porous cathode comprising a high-porosity cathode base material coated with a cathode active material to form a cathode active material surface and a porous anode comprising a high porosity anode base material coated with an anode active material to form an anode active material surface;
wherein a plurality of pores of the porous cathode comprise channels with a single cross-sectional geometric shape and have a length equal to the width of the porous cathode in a direction perpendicular to the cross-sectional plane of the plurality of pores of the porous cathode;
wherein a plurality of pores of the porous anode comprise channels with a single cross-sectional geometric shape and have a length equal to the width of the porous anode in a direction perpendicular to the cross-sectional plane of the plurality of pores of the porous anode; and
a fluid electrolyte comprising a working ion;
a closed loop fluidly connected to containers of the electrochemical cells and containing the fluid electrolyte; and
a pump configured to cause the fluid electrolyte to flow through the closed loop and the electrochemical cells during discharge of the battery;
wherein flow of the electrolyte through the plurality of pores of the porous cathode and in contact with an electrode is parallel to the cathode active material surface for a length of the plurality of pores of the porous cathode and
wherein flow of the electrolyte through the plurality of pores of the porous anode and in contact with an electrode is parallel to the anode active material surface for a length of the plane of the pore of the porous anode.

20. The flow-through rechargeable battery of claim 19, comprising between 2 and 500 electrochemical cells.

21. The flow-through rechargeable battery of claim 19, wherein the pump is configured to cause the fluid electrolyte to flow in a second direction, opposite the first direction, during charge of the battery.

22. The flow-through rechargeable battery of claim 19, comprising at least one internal loop fluidly connected between containers of the electrochemical cells and containing the fluid electrolyte, wherein the pump is also configured to cause the fluid electrolyte to flow through the internal loops in the first direction during discharge of the battery.

23. The flow-through rechargeable battery of claim 19, comprising at least one internal loop fluidly connected between containers of the electrochemical cells and containing the fluid electrolyte, wherein the pump is also configured to cause the fluid electrolyte to flow through the internal loops in the second direction during charge of the battery.

24. The flow-through rechargeable battery of claim 19, comprising at least one internal circuit electronically connecting at least two of the electrochemical cells.

25. The flow-through rechargeable battery of claim 19, wherein the cathode, the anode, or both of the electrochemical cells comprise a high-porosity base material having a porosity between 40% and 99%.

26. The flow-through rechargeable battery of claim 19, wherein both the cathode and the anode of the electrochemical cells comprise a high-porosity base material having a porosity between 40% and 99%.

27. The flow-through rechargeable battery of claim 19 wherein the cathode, the anode, or both of the electrochemical cells comprise a high-porosity base material coated with an active material and have a porosity between 5% and 50%.

28. The flow-through rechargeable battery of claim 19 wherein both the cathode and the anode of the electrochemical cells comprise a high-porosity base material coated with an active material and have a porosity between 5% and 50%.

29. The flow-through rechargeable battery of claim 19, wherein the pump is a positive-displacement pump, a peristaltic pump, a rotary-vane type pump, or progressive-cavity pump.

30. The flow-through rechargeable battery of claim 19, wherein the pump is configured to pump the fluid electrolyte through the electrochemical cell at a linear flow rate between 0.01 cm/s to 100 cm/s.

31. The flow-through rechargeable battery of claim 19, wherein the cathode, the anode, or both of the electrochemical cells comprise a high-porosity material having an internal surface area to volume ratio between 1/d and 6/d, in which d is the average maximum internal distance within a pore.

32. The flow-through rechargeable battery of claim 19, wherein the cross-sectional geometric shape is octagonal, hexagonal, square, rectangular, rhomboid, triangular, ovoid, oblate spherical, or circular and the cross-sectional geometric shape comprises an average cross-sectional maximum internal distance of between 0.01 mm and 10 mm.

33. The flow-through rechargeable battery of claim 32, wherein the pores have a length between 2 cm and 20 cm in a direction perpendicular to a cross-sectional plane of the pores.

34. The flow-through rechargeable battery of claim 32, wherein at least 60%, at least 80%, or at least 90% of all pores in the anode or cathode are continuously open along their respective lengths.

35. The flow-through rechargeable battery of claim 32, wherein the electrode comprises between 10 and 100 layers of stacked, folded, or stacked and folded high-porosity material.

36. The flow-through rechargeable battery of claim 19, wherein the working ion comprises an alkali metal ion.

37. The flow-through rechargeable battery of claim 36, wherein the anode of the electrochemical cells comprises a metal operable to form a solid solution of the hydrogen ion.

38. The flow-through rechargeable battery of claim 19, wherein the working ion comprises hydrogen ion ($H^+$) or hydroxyl ($OH^-$) ion.

39. The flow-through rechargeable battery of claim 19, wherein electrochemical cells further comprise a separator comprising an electronically insulating permeable membrane configured to allow passage of the working ion and flow of the fluid electrolyte through the membrane.

40. A flow-through rechargeable electrochemical cell comprising:
a container housing a porous cathode comprising a high-porosity cathode base material coated with a cathode active material to form a cathode active material surface and a porous anode comprising a high porosity anode base material coated with an anode active material to form an anode active material surface;
a closed loop fluidly connected to the container;
a fluid electrolyte in the container and closed loop and comprising a working ion;
a pump configured to cause the fluid electrolyte to flow through the closed loop, the porous cathode, and the porous anode during discharge of the electrochemical cell;
wherein a plurality of pores of the porous cathode comprise straight channels with a single cross-sectional geometric shape and have a length equal to the width of the porous cathode in a direction perpendicular to the cross-sectional plane of the plurality of pores of the porous cathode;
wherein a plurality of pores of the porous anode comprise straight channels with a single cross-sectional geometric shape and have a length equal to the width of the porous anode in a direction perpendicular to the cross-sectional plane of the plurality of pores of the porous anode; and
wherein flow of the electrolyte through the porous cathode and the porous anode is laminar flow.

41. The flow-through rechargeable electrochemical cell of claim 40, wherein the cathode, the anode, or both comprise a high-porosity base material having a porosity between 40% and 99%.

42. The flow-through rechargeable electrochemical cell of claim 40, wherein at least 60%, at least 80%, or at least 90% of all pores in the electrode are continuously open along their respective lengths.

43. The flow-through rechargeable battery of claim 40, wherein the working ion comprises an alkali metal ion.

44. The flow-through rechargeable battery of claim 40, wherein the working ion comprises hydrogen ion ($H^+$) or hydroxyl ($OH^-$) ion.

45. The flow-through rechargeable battery of claim 44, wherein the anode comprises a metal operable to form a solid solution of the hydrogen ion.

46. The flow-through rechargeable electrochemical cell of claim 40, wherein electrochemical cell further comprises a separator comprising an electronically insulating permeable membrane configured to allow passage of the working ion and flow of the fluid electrolyte through the membrane.

* * * * *